US011122063B2

(12) United States Patent
DiValentin et al.

(10) Patent No.: US 11,122,063 B2
(45) Date of Patent: Sep. 14, 2021

(54) MALICIOUS DOMAIN SCOPING RECOMMENDATION SYSTEM

(71) Applicant: Accenture Global Solutions Limited, Dublin (IE)

(72) Inventors: Louis William DiValentin, Fairfax, VA (US); Dillon J. Cullinan, Arlington, VA (US)

(73) Assignee: Accenture Global Solutions Limited, Dublin (IE)

( * ) Notice: Subject to any disclaimer, the term of this patent is extended or adjusted under 35 U.S.C. 154(b) by 229 days.

(21) Appl. No.: 15/917,908

(22) Filed: Mar. 12, 2018

(65) Prior Publication Data
US 2019/0158520 A1    May 23, 2019

Related U.S. Application Data

(60) Provisional application No. 62/588,053, filed on Nov. 17, 2017.

(51) Int. Cl.
*H04L 29/06* (2006.01)
(52) U.S. Cl.
CPC ...... *H04L 63/1425* (2013.01); *H04L 63/0281* (2013.01); *H04L 63/145* (2013.01);
(Continued)
(58) Field of Classification Search
CPC ............. H04L 63/1425; H04L 63/0281; H04L 63/1408; H04L 63/1416; H04L 63/145; H04L 2463/144
(Continued)

(56) References Cited

U.S. PATENT DOCUMENTS 6,262,976 B1 * 7/2001 McNamara ............. H04L 45/00
                                                              370/254
6,996,843 B1    2/2006 Moran
(Continued)

FOREIGN PATENT DOCUMENTS

WO    WO 2016/118153            7/2016
WO    WO-2016118153 A1 *   7/2016   ........... H04L 41/142

OTHER PUBLICATIONS

Labib, Khaled. "Computer security and intrusion detection." XRDS: Crossroads, The ACM Magazine for Students 11, No. 1 (2004): 2-2. (Year: 2004).*
(Continued)

*Primary Examiner* — Luu T Pham
*Assistant Examiner* — Walter J Malinowski
(74) *Attorney, Agent, or Firm* — Fish & Richardson P.C.

(57) ABSTRACT

Identification of malicious network domains through use of links analysis of graph representation of network activity, such as a bipartite graphs. An example method includes setting an initial reputation score for each of a plurality of host computers and each of a plurality of domains accessed by the plurality of host computers; until a predefined condition is satisfied, iteratively rescoring the reputation scores for each of the plurality of host computers based upon the reputation scores of the plurality of domains; and rescoring the reputation scores for each of the plurality of domains based upon the reputation scores of the plurality of host computers; and determining, based upon the rescored reputation scores for each of the plurality of host computers and the rescored reputation scores for each of the plurality of domains, whether one or more domains amongst the plurality of domains are exhibiting malicious behavior.

18 Claims, 10 Drawing Sheets

(52) U.S. Cl.
CPC ...... *H04L 63/1408* (2013.01); *H04L 63/1416* (2013.01); *H04L 2463/144* (2013.01)

(58) Field of Classification Search
USPC .......................................................... 726/12
See application file for complete search history.

(56) References Cited

U.S. PATENT DOCUMENTS

| | | | |
|---|---|---|---|
| 7,706,393 B2* | 4/2010 | Hill | H04L 49/30 370/422 |
| 8,341,745 B1 | 12/2012 | Chau et al. | |
| 8,561,184 B1* | 10/2013 | Marsa | H04L 67/22 726/22 |
| 8,788,407 B1* | 7/2014 | Singh | G06F 16/335 705/38 |
| 8,826,444 B1* | 9/2014 | Kalle | G06F 21/552 726/26 |
| 8,843,997 B1 | 9/2014 | Hare | |
| 8,904,520 B1* | 12/2014 | Nachenberg | G06F 21/564 726/22 |
| 9,124,622 B1* | 9/2015 | Falkowitz | H04L 63/1416 |
| 9,166,997 B1* | 10/2015 | Guo | H04L 63/1433 |
| 9,635,049 B1* | 4/2017 | Oprea | H04L 63/145 |
| 9,767,689 B1* | 9/2017 | Cain | B60W 40/09 |
| 9,838,407 B1* | 12/2017 | Oprea | H04L 63/1416 |
| 10,129,271 B2* | 11/2018 | Mrkos | H04L 63/1416 |
| 10,164,995 B1* | 12/2018 | Fang | G06F 16/9024 |
| 10,574,695 B2* | 2/2020 | Jeng | H04L 63/14 |
| 2005/0131848 A1* | 6/2005 | Chickering | G06N 20/00 706/12 |
| 2006/0059238 A1* | 3/2006 | Slater | H04L 51/12 709/206 |
| 2007/0255707 A1* | 11/2007 | Tresser | H04N 21/4668 |
| 2008/0133540 A1* | 6/2008 | Hubbard | H04L 63/101 |
| 2008/0282338 A1* | 11/2008 | Beer | H04L 63/1441 726/12 |
| 2008/0313500 A1* | 12/2008 | Strauss | H04L 67/104 714/37 |
| 2009/0262664 A1* | 10/2009 | Leighton | H04L 41/12 370/254 |
| 2010/0153354 A1* | 6/2010 | Buccella | G06F 16/9535 707/706 |
| 2010/0235915 A1* | 9/2010 | Memon | H04L 63/145 726/23 |
| 2011/0067101 A1* | 3/2011 | Seshadri | H04L 63/1416 726/22 |
| 2011/0185423 A1* | 7/2011 | Sallam | G06F 21/566 726/23 |
| 2012/0233665 A1* | 9/2012 | Ranganathan | G06F 21/51 726/4 |
| 2013/0024443 A1* | 1/2013 | Achuthan | G06F 16/2423 707/722 |
| 2013/0036466 A1* | 2/2013 | Penta | H04L 63/102 726/22 |
| 2013/0179974 A1* | 7/2013 | Manadhata | H04L 63/145 726/24 |
| 2013/0247201 A1* | 9/2013 | Alperovitch | H04L 63/14 726/24 |
| 2013/0312097 A1* | 11/2013 | Turnbull | G06F 21/55 726/24 |
| 2014/0090056 A1* | 3/2014 | Manadhata | G06F 21/552 726/23 |
| 2014/0331322 A1* | 11/2014 | Jaroch | H04L 63/1416 726/23 |
| 2015/0195299 A1* | 7/2015 | Zoldi | H04L 63/1408 726/25 |
| 2015/0264061 A1* | 9/2015 | Ibatullin | H04L 63/145 726/23 |
| 2015/0288715 A1* | 10/2015 | Hotchkiss | H04L 63/0876 726/7 |
| 2015/0339769 A1* | 11/2015 | deOliveira | G06Q 40/025 705/38 |
| 2016/0080404 A1* | 3/2016 | Kohout | H04L 63/1425 726/23 |
| 2016/0080417 A1* | 3/2016 | Thomas | H04L 63/1416 726/1 |
| 2016/0125081 A1* | 5/2016 | Blanco | G06F 16/951 707/709 |
| 2016/0156655 A1* | 6/2016 | Lotem | H04L 63/1425 726/23 |
| 2017/0091270 A1* | 3/2017 | Guo | G06F 16/58 |
| 2017/0295187 A1* | 10/2017 | Havelka | H04L 63/1441 |
| 2017/0346834 A1* | 11/2017 | Shaikh | H04L 63/1416 |
| 2017/0353480 A1* | 12/2017 | Gao | H04L 63/1425 |
| 2017/0359220 A1* | 12/2017 | Weith | G06F 16/23 |
| 2017/0374089 A1* | 12/2017 | Anderson | G06N 20/00 |
| 2018/0181750 A1* | 6/2018 | Lamothe-Brassard | G06F 21/552 |
| 2018/0189667 A1* | 7/2018 | Tsou | G06N 5/003 |
| 2018/0314965 A1* | 11/2018 | Dodson | H04L 63/1425 |
| 2018/0343272 A1* | 11/2018 | Khalil | H04L 63/1425 |
| 2018/0367548 A1* | 12/2018 | Stokes, III | H04L 63/145 |
| 2019/0050562 A1* | 2/2019 | Rhee | H04L 63/1425 |

OTHER PUBLICATIONS

Boggs, Nathaniel, Sharath Hiremagalore, Angelos Stavrou, and Salvatore J. Stolfo. "Cross-domain collaborative anomaly detection: So far yet so close." In International Workshop on Recent Advances in Intrusion Detection, pp. 142-160. Springer, Berlin, Heidelberg, 2011. (Year: 2011).*

Komashinskiy, Dmitriy, and Igor Kotenko. "Malware detection by data mining techniques based on positionally dependent features." In 2010 18th Euromicro Conference on Parallel, Distributed and Network-based Processing, pp. 617-623. IEEE, 2010. (Year: 2010).*

Khalil, Issa, Ting Yu, and Bei Guan. "Discovering malicious domains through passive DNS data graph analysis." In Proceedings of the 11th ACM on Asia Conference on Computer and Communications Security, pp. 663-674. 2016. (Year: 2016).*

Yadav, Sandeep, Ashwath Kumar Krishna Reddy, AL Narasimha Reddy, and Supranamaya Ranjan. "Detecting algorithmically generated domain-flux attacks with DNS traffic analysis." IEEE/Acm Transactions on Networking 20, No. 5 (2012): 1663-1677. (Year: 2012).*

Huang, Yonghong, and Paula Greve. "Large scale graph mining for web reputation inference." In 2015 IEEE 25th International Workshop on Machine Learning for Signal Processing (MLSP), pp. 1-6. IEEE, 2015. (Year: 2015).*

European Search Report and Written Opinion in European Application No. 18205262.1, dated Mar. 29, 2019, 6 pages.

EP Office Action in European Application No. EP 18205262, dated Mar. 10, 2020, 5 pages.

* cited by examiner

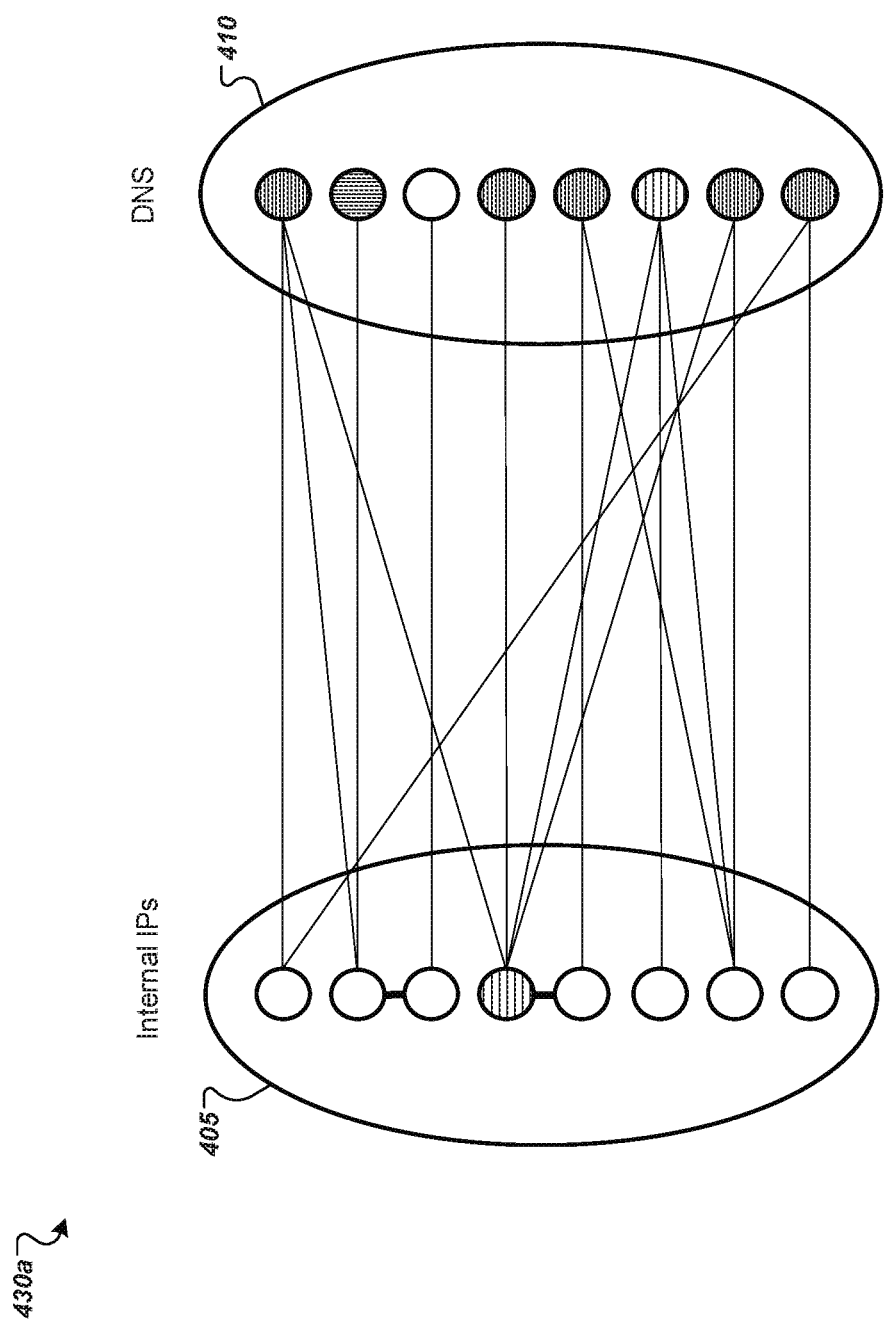

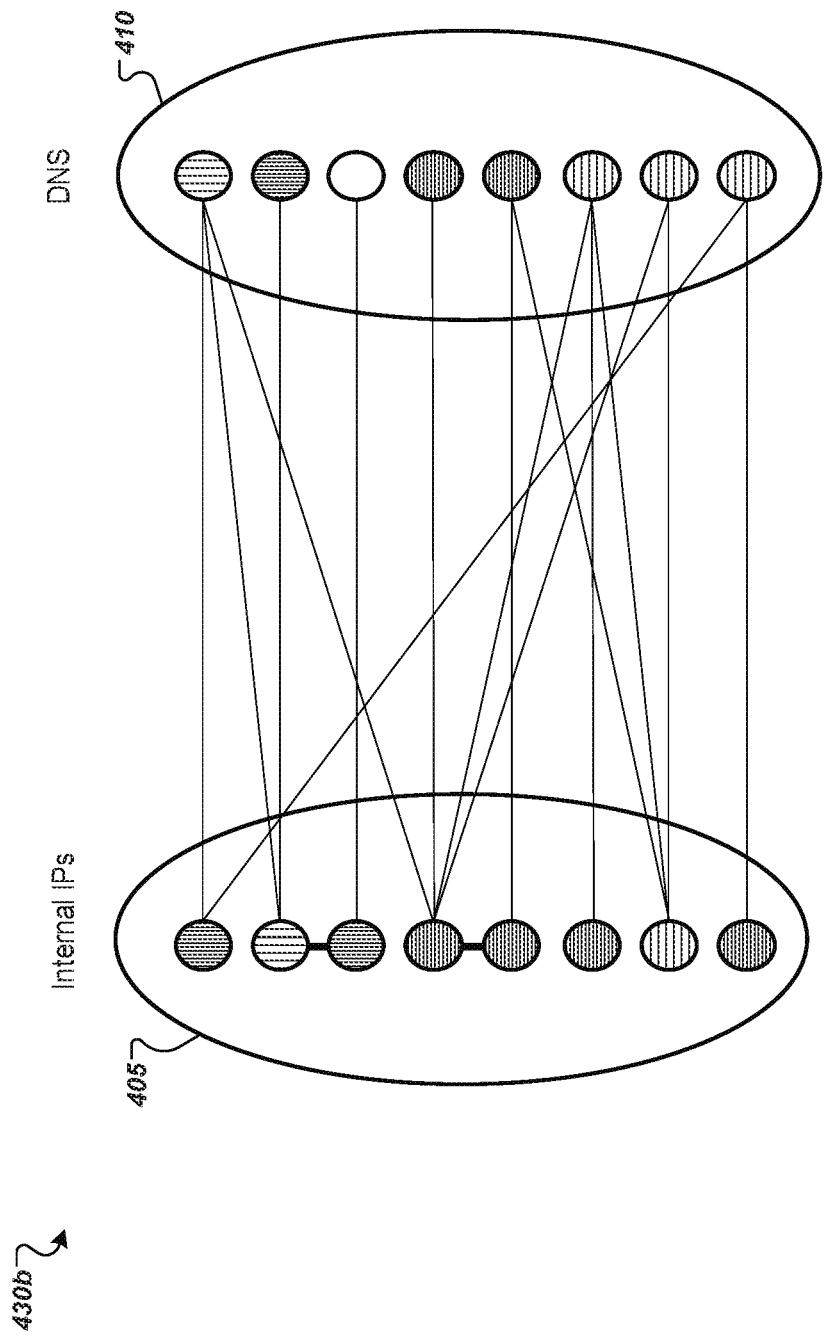

MALICIOUS DOMAIN SCOPING RECOMMENDATION SYSTEM

CROSS-REFERENCE TO RELATED APPLICATION

This application claims the benefit of U.S. Provisional Pat. App. No. 62/588,053, filed Nov. 11, 2017, which is incorporated herein by reference.

FIELD

The present specification is related to identification of malicious network domains through use of links analysis of graph representations of network activity, such as bipartite graphs.

BACKGROUND

In corporate and other secured networks, computers located internal to the network may communicate with resources on unprotected public networks, such as the Internet. External resources, for examples domains on an unprotected network, are comparatively more susceptible to vulnerabilities than corporate networks, for example, having firewalls and other security mechanisms. As a result, communication with these resources, or external domains, can cause the computers and other computing resources to become vulnerable to malicious activity and attackers, such as botnets and malware.

An internal host that has been infected with malware may be further manipulated by the attacker to perform malicious actions, in some cases remotely. For example, malware may use the compromised computer in an attempt to communicate to outbound malicious Command-and-Control (C&C) servers. In order to maintain availability to bots (e.g., computers used to distribute malware and gather misappropriated information) that are under the control of the attacker, C&C servers often use various Domain Name System (DNS) based techniques for concealment from network security tools such as, switching domains on a frequent basis, randomly generating new domains, and registering disguising domains. Conventional network security tools, for example domain blacklists, may be circumvented by concealed C&C servers effectively obfuscating their relationship to a known malicious domain. Moreover, DNS-based techniques may evade corrective actions instituted by security administrators, for instance Security Operation Center analysts when remediating compromised internal hosts. As an example, multiple C&C servers may gain access to a network by exploiting a single botnet for malicious activity, but only one server from the multiple C&C servers may be blacklisted. Therefore, it may be desirable to protect computers and other networking resources from malicious attacks using improved malicious domain classification techniques.

SUMMARY

The subject matter in this specification relates to generating a graph representation of the network, and the communication between networked computer assets (e.g., internal hosts and external domains) by a device configured for malicious domain classification. The device includes one or more modules that apply various graph analytical measures to an iterative tuning process, which calculates and propagate reputation scores of nodes associated with identified domains and internal hosts in order to identify potentially malicious domains amongst unidentified domains. The device applies the graph analytical measures to recalculate reputation scores in iterations, until a predetermined condition is reached, ending the calculation process. Final reputation scores are computed and maintained by the device. In some implementations, application of the graph analytics enables ranking of domains, based on the respective final reputation score for the domain, in an order relating to the probability of a malicious classification for the domain. In some implementations, application of graph analytic measures enables visualization of the network and connections communication between internal hosts and external domains including visual cues indicating the calculated reputation scores.

An innovative aspect of the subject matter described in this specification can be embodied in a computer-implemented method that includes setting an initial reputation score for each of a plurality of host computers and each of a plurality of domains accessed by the plurality of host computers; and, until a predefined condition is satisfied, iteratively rescoring the reputation scores for each of the plurality of host computers based upon the reputation scores of the plurality of domains; and rescoring the reputation scores for each of the plurality of domains based upon the reputation scores of the plurality of host computers. The method also includes determining, based upon the rescored reputation scores for each of the plurality of host computers and the rescored reputation scores for each of the plurality of domains, whether one or more domains amongst the plurality of domains are exhibiting malicious behavior.

Implementations may include one or more of the following features. For example, rescoring the reputation scores for each of the plurality of domains may further include transmitting, from each of the plurality of domains, the reputation score for the domain to each host computer connected to the domain; receiving, by each of the plurality of domains, a reputation score for each host computer connected to the domain; and rescoring, for each of the plurality of domains, the reputation score for the domain based on a summation of the received reputation scores for each host computer connected to the domain. The summation of the received reputation scores for each host computer connected to the domain may be adjusted based on a sigmoid function including a specified learning rate. The method may further include bounding a reputation score for a domain associated with a number of connections above a maximum threshold or a number of connections below a minimum, where bounding is prior to transmitting. Rescoring the reputation scores for each of the plurality of host computers may further include transmitting, from each of the plurality of host computers, the reputation score for the host computer to each domain to which the host computer is connected; receiving, by each of the plurality of host computers, a reputation score for each domain to which the host computer is connected; and rescoring, for each of the plurality of host computers, the reputation score for the host computer based on a summation of the received reputation scores for each domain to which the host computer is connected. The summation of the received reputation scores for each domain to which the host computer is connected maybe adjusted based on a sigmoid function including a specified learning rate. The method may further include performing one or more corrective actions, upon determining that one of more domains amongst the plurality of domains are exhibiting malicious behavior, where the one or more corrective actions comprise: rescoring a blacklist of known malicious domains to include the one or more domains; ranking the one or more domains as potentially malicious domains in an order corresponding to the rescored reputation scores for each of the plurality of domains respectively; and redirecting network traffic attempting to access the one or more domains. The predefined condition may be at least one of: reaching a specified number of iterations; identifying that a delta between rescored reputation scores is less than a predefined threshold; and identifying that no delta between rescored reputation scores. The initial reputation scores for each of a plurality of domains may be one or more of: a positive value indicating a known good domain; a first negative value indicating a known malicious domain; and a second negative value indicating a known suspicious domain, where the second negative value is less than the first negative value. The initial reputation score for a domain included in a blacklist of known malicious domains or a whitelist of good domains may be precluded from rescoring. The initial reputation scores for each of a plurality of host computers may be one or more of: a positive value indicating a host computer known not associated with known malicious behavior; and a negative value indicating a host computer associated with known malicious behavior. The method may also include assigning one or more time periods associated with identified Internet Protocol (IP) addresses for the plurality of host computers, propagating a portion of a reputation score for a host computer associated with an IP address corresponding to a first time period to the same IP address corresponding to one or more additional time periods; and rescoring the reputation scores for each of the plurality of host computers based on the assigned time periods and the propagated portion of a reputation score.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

FIGS. 4A-4G illustrate examples of bipartite graphs corresponding to multiple iterations of graph analysis techniques implemented relative to the example computing network of FIG. 1.

Like reference numbers and designations in the various drawings indicate like elements.

DETAILED DESCRIPTION

This specification describes systems and methods that include conversion of log data retrieved from a network node, such as proxy logs, to a graph representation of the network and communication between internal hosts and external domains by a malicious domain classification device. The malicious domain classification device includes one or more modules that apply various graph analytical measures to iteratively calculate and propagate reputation scores from identified domains and internal hosts in order to identify potentially malicious domains amongst unidentified domains. The malicious domain classification device applies the analytical measures to recalculate reputation scores until a predetermined condition is reached ending the calculation process and final reputation scores are computed and maintained. In some implementations, application of the graph analysis enables ranking of domains, based on the respective final reputation score for the domain, in an order relating to the probability of a malicious classification for the domain. In some implementations, application of the graph analysis enables visualization of the network and connections communication between internal hosts and external domains including visual cues indicating the calculated reputation scores.

Figure 1:
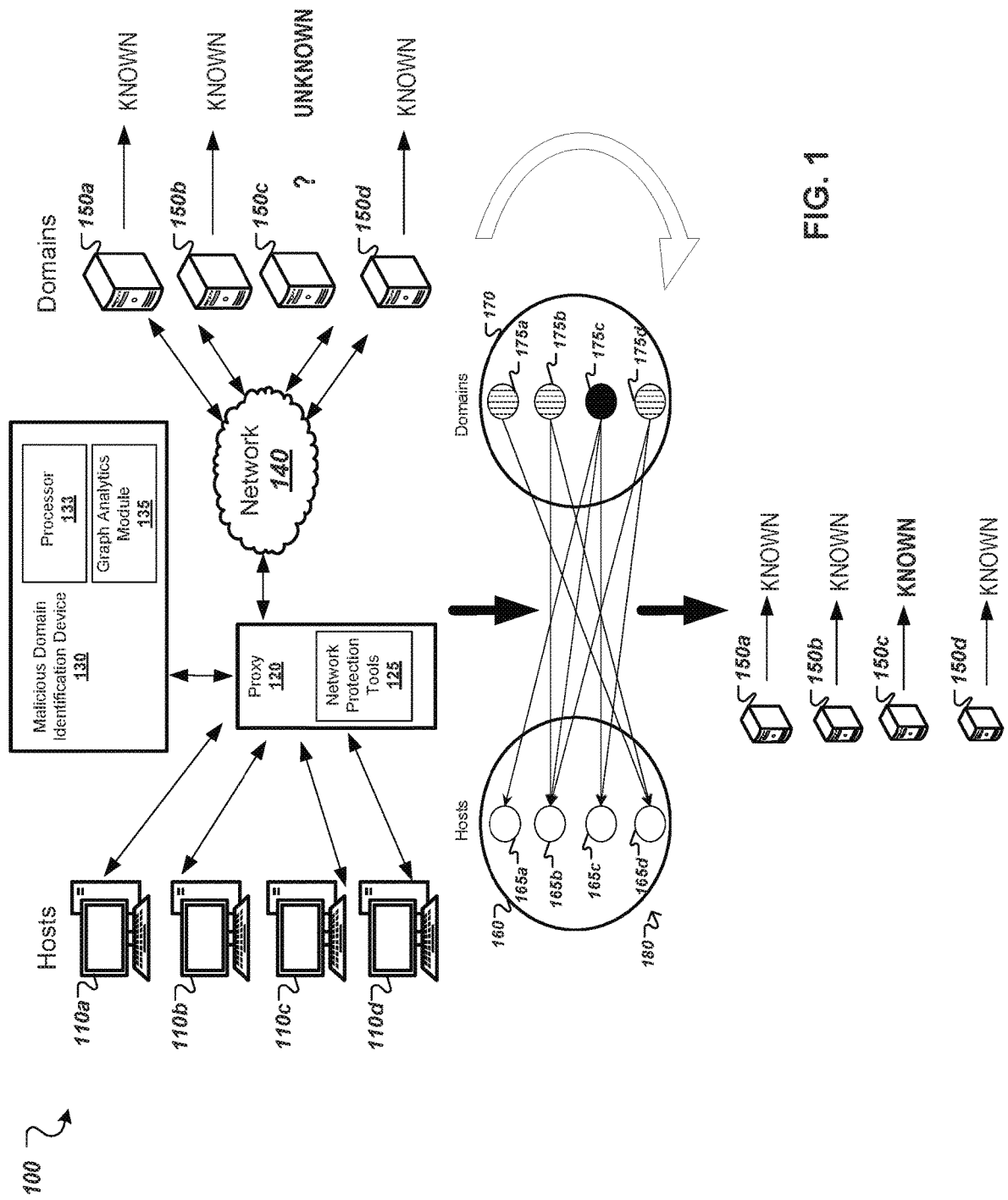
FIG. 1 illustrates a block diagram of an example networked computer system that includes an example Malicious Domain Identification Device (MDID) for implementing graph analysis techniques.

FIG. 1 illustrates a block diagram of an example networked computing system 100 that includes an example Malicious Domain Identification Device (MDID) 130 for implementing graph analysis techniques. The system 100 includes computer assets located locally to network 140, shown as internal hosts 110*a/b/c/d*, proxy 120 including Network Protection Tools 125, MDID 130, and computer assets located remotely from network 140, shown as external domains 150 *a/b/c/d*. In some implementations, hosts 110*a/b/c/d* allow users to engage in various compute related activities that generate data communications traffic within, and outside of network 140. Activities may include, for example, accessing intranet sites, drafting and sending email correspondences, printing documents, accessing internet, and accessing shared local and external resources, such as file servers and cloud based applications.

Hosts 110*a/b/c/d* can include various computer assets employed as client devices, for instance standard laptop and desktop computers, print servers and printer/copier devices, email servers, application servers, routers, switches, intranet and related file servers, or any other computing device or asset associated with a computer network. For example, host 110*a* can be a laptop computer, host 110*b* can be a desktop computer, host 110*c* can be an email server, host 110*d* can be a router. Although four hosts 110*a/b/c/d* are shown in FIG. 1, in some implementations, system 100 may include more or fewer hosts 110 that cooperate to enable a user to engage in the abovementioned computer related activities.

FIG. 1 shows the system 100 as including network 140. Hosts 110*a/b/c/d* can be connected to network 140, which can be a private network, a public network, a virtual private network, etc. Network 140 can be implemented as either a wired computer network (e.g., Ethernet) or a wireless computer network. Examples of computer networks include, but are not limited to, a local area network (LAN), a wide area network (WAN), and the Internet. In some implementations, network 140 is a LAN, including hosts 110*a/b/c/d* and various other computer assets that may be proximately located within a vicinity also connected thereto. In some implementations, computer network 140 can be a wireless local area network (WLAN), such as an IEEE 802.n network. Thus, hosts 110*a/b/c/d* can be communicatively coupled to each other and other devices connected thereto, and further capable of wireless transmission of data via the computer network 140.

Domains 150*a/b/c/d* are shown as computer assets, such as servers or host computers, employed for providing content or services via a network. Domains 150*a/b/c/d* can be configured to support network accessible content, such as websites that include individual web pages. Although illustrated as a single computer asset, in some instances, a domain can be considered a group of computer assets sharing a common part of an IP address. Domains 150*a/b/c/d* can be accessible by a wide area network, such as the Internet. As a result, the Internet can provide access to vast amounts of Internet-based content to the clients operating hosts 110*a/b/c/d* local to network 140, for example by using networking technologies (e.g., WiFi) and appropriate protocols (e.g., TCP/IP) to establish a connection with domains 150*a/b/c/d*.

As an example, a user of one of the internal hosts 110*a* can request access to a domain 150*a* by sending a HTTP request for a website hosted by domain 150*a*. The request can be transmitted from host 110*a* to the proxy 120 functioning as the intermediary between the client internal to network 140 and the external domain 150*a*. In order to establish the connection with domain 150*a*, the proxy 120 opens a connection to the domain 150*a* on behalf of the requesting host 110*a*. In some cases, a hostname is associated with the domain 150*a*. It is also possible for various hostnames to be associated with a single root domain, such as "example.com". In referring to the example, a root domain "example.com" can be used for hosting a website, where visitors can still access the site from a web browser on host 110*a* by typing different hostnames associated with the domain, for example "http://www.example.com" or "http://example.com".

In instances where a hostname is specified in the HTTP request to access a domain 150*a*, for example, the hostname must be resolved to an IP address before IP-based communication with the desired domain is performed. The system 100 can employ DNS mechanisms to determine an IP address for a requested hostname, by using IP address mappings to Fully Qualified Domain Name (FQDNs), for example. Once an IP address is resolved for the requested hostname, packets can be routed from the requesting host 110*a* to the domain 150*a*, as an example, thereby establishing the connection to the external domain. In some cases, DNS queries may be utilized to retrieve resolved IP addresses for domains 150*a/b/c/d*. In continuing with the aforementioned example, the DNS query can include an IP address associated with the internal host 110*a* and a hostname corresponding to the external domain 150*a*. Thus, log data, such as DNS queries, logs generated by the network protection tools 125, proxy logs, and the like, can contain information representing a connection that relates the internal hosts 110*a/b/c/d* to any domains 10*a/b/c/d* accessed by the respective host. In an implementation, the MDID 130 employs various log data, including connection related information such as DNS queries, in order to generate bipartite graphs, as discussed in greater detail below in reference to MDID 130.

FIG. 1 also illustrates that domains 150*a/b/c/d* are classified as relating to a recognized, or estimated, malicious threat potential. Domains that have been previously identified by the system 100 can be considered as already recognized and associated with a corresponding classification. As an example, a domain that is currently included on a blacklist maintained by the Network Protection Tools 125 has undergone verification (e.g., by a third party, or human operator) and thus is confirmed as malicious. One or more characteristics for determining a malicious domain can include, but are not limited to: a domain generating a DNS error; domain known to be associated with malware; domain resolving to an IP address associated with malware; and the like. Subsequently, blacklisted domains can be considered as being assigned to a known classification. Further, domains that are confirmed as non-malicious (e.g., no suspicious activity, highly trafficked), or identified as suspicious (e.g., potentially malicious) can also be considered as being classified in a known class. According to some implementations, domains can be identified as one of a plurality of classifications, including but not limited to: known non-malicious (e.g., good); known malicious; and known suspicious. Additional classifications may be utilized by the system 100 as deemed necessary and appropriate. FIG. 1 illustrates domains 150*a/b/d* as having a "KNOWN" classification indicating whether the corresponding domain is malicious, non-malicious, or suspicious.

Alternatively, domain 150*c* is illustrated as being "UNKNOWN", or unassigned to a classification. For example, domain 150*c* may not be present in any of the predefined lists maintained by network protection tools 125, such as blacklists and whitelists. Various scenarios may cause a domain, shown as domain 150*c*, to be determined as "UNKNOWN" by the system 100, such as the domain being associated with a newly registered domain name, or the domain not being previously accessed by an internal host. In addition to the domain classifications, the internal hosts 110*a/b/c/d* can also be classified based on a malicious threat potential. For example, an internal host that is identified as the source of a known security event, or an internal host attempting to access any known or suspicious domain can be an infected computer attempting to connect to a malware C&C, and thus may be classified as malicious.

FIG. 1 also shows system 100 as including proxy 120. Proxy 120 is implemented as a computer device, such as a server, which can be used as an intermediate communication point between internal hosts 110*a/b/c/d*, which are devices local to network 140, and remote computer assets illustrated as domains 150*a/b/c/d*. Thus, by employing the proxy 120, internal hosts 110*a/b/c/d* can establish connections with domains 150*a/b/c/d* that are accessible via a unsecure and public wide area networks (WANs), (e.g., the Internet). For example, an internal host 110*a* can be communicatively coupled to network 140 that is operated by a user's company (e.g., enterprise local area network). The internal host 110*a* can initially communicate with the proxy 120, which is further connected to the Internet to access domain 150*a*. The proxy 120 can act as an intermediary to communicate a user-initiated request, for instance, between the company computer on the local network and a domain that is accessible via the Internet, to retrieve Internet-based content (e.g., online movie). As such, a computer assets on network 140 that may be a LAN operated by a company (e.g., enterprise local area network) can initially communicate with proxy 120, which is further connected to the Internet. The proxy 140 can act as an intermediary to communicate a user-initiated access request, for instance, between hosts 110*a/b/c/d* local to network 140, which may be subject to various network security mechanisms. Network security functions can also be implemented by the proxy 120, and used within network 140 to protect the local computer assets during communication with unknown, untrusted, or malicious sources on the Internet.

As shown, hosts 110*a/b/c/d* are in data communication with network with the proxy 120 including Network Protection Tools 125. Network Protection Tools 125 provide system 100 with various network security functions. Example network security functions include blocking or filtering of data packets or other data traffic from entering and/or exiting network 140. Further, example Network Protection Tools 125 include firewalls, intrusion detection systems, intrusion prevention systems, packet sniffing devices, vulnerability scanning devices, or any other network security devices associated with a computer. Thus, hosts 150a/b/c/d, which may be company computers, may route communication destined for computers external to network 140 through proxy 120 which utilizes the Network Protection Tools 125 to prevent malicious attacks that potentially comprised by intrusive software (e.g., viruses or malware) that may be disseminated using unsecure Internet resources. In some instances, the Network Protection Tools 125 may control, identify, and mitigate attacks prior to entering the network 140. However, in the case an internal computer, such as host 150a, has been infected, the host can then be further exploited to spread malicious software to other networks and resources. Therefore, it may be desirable to identify both the computer that may be exhibiting anomalous behavior, such as requesting invalid domains, and the external computer that is potentially malicious, or posing a security threat on the network (i.e., infected with malware).

As discussed in more detail below, in some implementations, the proxy 120 and the one or more tools/devices that collectively form the Network Protection Tools 125 can each be designed or configured to periodically generate log data/files that include certain parameters and or attributes associated with security and non-security related events or activities that occur within network 140. Each log file generated by the respective devices of the proxy 120 and the Network Protection Tools 125 can be provided to the MDID 130 though a communication path associated with network 140.

Malicious Domain Identification Device (MDID) 130 includes processor 133 and Graph Analytics Module 135. In some implementations, processor 133 can include one or more processors (e.g., microprocessors or central processing units (CPU)), graphics processing units (GPUs), application specific integrated circuits (ASICs), or a combination of different processors. In alternative implementations, MDID 130 can include other computing resources/devices (e.g., cloud-based servers) that provide additional processing options for performing one or more of the determinations and calculations described in this specification. Although shown in FIG. 1 as being a stand-alone data analysis device, in alternative embodiments, the functions and capabilities of the MDID 130 can be a module that executes the graphical analysis implemented within the processing elements of another computer asset of system 100, for example proxy 120.

Processor 133 can include one or more memory units or memory banks. In some implementations, processor 133 executes programmed instructions stored in memory to cause the Graph Analytics Module 135 and MDID 130 to perform one or more functions described in this specification. The memory of processor 133 can include one or more non-transitory machine-readable storage mediums. The non-transitory machine-readable storage medium can include solid-state memory, magnetic disk, and optical disk, a portable diskette, a random access memory (RAM), a read-only memory (ROM), an erasable programmable read-only memory (e.g., EPROM, EEPROM, or Flash memory), or any other tangible medium capable of storing information.

Graph Analytics Module 135 can include certain instructional logic or program code that applies, to log data, one or more graph analytics measures. As described in more detail below, with reference to FIG. 2, Graph Analytics Module 135 of MDID 130 can be configured to structure log data in a graphical format, such as a bipartite graph, and to apply one or more graph analytic measures to the structured log data to assign, propagate, and identify nodes based on values, e.g., the rank, confidence or likelihood of maliciousness for each node, which are referred to herein as reputation scores. Reputation scores can be generated or scaled in multiple ways, however, in one example, when comparing two reputation scores, the lower the reputation score, the higher the likelihood of maliciousness.

The Graph Analytics Module 135 can receive as input log data generated by the proxy 120 and/or the Network Protection Tools 125 to generate a visualization of the network, such as graph network or model. In an implementation, the Graph Analytics Module 135 produces a bipartite graph 170 of the network, including nodes of the graph representing hosts and domains, and edges of the graph representing connections between a host and a domain accessed by that host. A bipartite graph 170, also called a bigraph, can be generally described as including a set of graph vertices decomposed into two disjoint sets such that no two graph vertices within the same set are adjacent.

Subsequently, the Graph Analytics module 135 can apply graph analysis measures to the resulting bipartite graph 170. The Graph Analytics Module 135 applies graph analysis measures that further apply algorithms to iteratively calculate reputation scores for internal hosts 110a/b/c/d and calculate reputation scores for domains 150a/b/c/d in a score tuning process. The score tuning process considers temporal factors, such as including one or more previous reputation scores of a node that are associated with estimations of the nodes risk of maliciousness at a preceding time, during its computation of a current reputation score for that node. Thus, the ability of the Graph Analytics Module 135 to apply temporal aspects in the analysis allows previous reputation scores to impact a current score. Thereby, the Graph Analytics Module 135 mathematically implements the conceptual relationship between prior risks of the node and estimating new risk of maliciousness for the same node, in calculating reputation scores which may realize improved accuracy. According to the disclosed embodiments, the Graph Analytics Module 135 applies algorithms to iteratively calculate reputation scores for internal hosts 110a/b/c/d, referred to as clients, and calculate reputation scores for domains 150a/b/c/d, referred to as domains, as shown in the Equations (1) and (2), below:

$$R_{(i+1)}(\text{client}) = S(R_i(\text{domain}) + \sum_d \frac{R_i(\text{domain}_j)}{\text{degree of } \text{domain}_j} \qquad (1)$$

In Equation (1), d is the set of adjacent domains, and $R_i$ is the reputation score of $\text{domain}_j$ in set d at time i.

$$R_{i+1}(\text{domain}) = S(R_i(\text{client}) + \sum_c \frac{R_i(\text{client}_j)}{\text{degree of } \text{client}_j} \qquad (2)$$

In Equation (2), c is the set of adjacent clients, and $R_i$ is the reputation score of client in set c at time i.

The Graph Analytics Module 135 is configured to further apply various enhancement operations and algorithms, where each enhancement can be performed in concert with the abovementioned graph analysis measures, or in combinations thereof. In some embodiments, the Graphic Analytics Module 135 is configured to perform one or more of the following enhancement operations, including: propagating reputation scores over multiple IP time periods; applying learning rate to iterative tuning process; locking confirmed reputation scores; and bounding transmitted reputation scores. Therefore, the Graph Analytics Module 135 is configured to apply the enhancement operations in its function, and may realize benefits associated with improved accuracy (e.g., reduced false positives) and increased processing speed, for example associated with the MDID 130 executing the aforementioned graph analysis measures.

As an example, system 100 can implement the disclosed graph analysis and malicious domain identification techniques to determine whether an unclassified domain 150c, illustrated "UNKNOWN", may be potentially malicious. In some cases, the MDID 130 is configured to periodically execute the process, which updates calculations to determine new or subsequent set of graph analytics and reputations scores at predetermined time intervals, for example every 15 days. A trigger parameter associated with an activity/event can be identified by the proxy 120, which causes the MDID 130 to retrieve the most recently calculated reputations scores and/or initiate an update to computer reputation scores. For instance, one such event can be a source address IP, associated with host 150c in the example, attempting to make a number of outbound connections that exceeds a threshold number to a destination IP address that is associated with an unknown or suspicious domain, domain 150c. Upon detecting the event, the MDID 130 can access log data from the proxy 120 through a commutations path, and produces bipartite graph 170 of the network based, at least in part, on the extracted log data.

Bipartite graph 180 includes nodes representing computer assets, and edges representing, for example, specific log entries including parameters associated with network activity of certain nodes. In some implementations, the parameters include, for example, the source IP address of a computer asset sending data, and a destination IP address receiving the data. The bipartite graph 180 shows two disjoint sets of nodes, set 160 on one side of the graph and set 170 on the opposing side of the graph. Set 160 includes nodes 165a/b/c/d which serves as graphical representations of the internal hosts 110a/b/c/d. As shown, set 170 includes nodes 170a/b/c/d, representing the domains a/b/c/d, accessed by the respective hosts. Bipartite graph 180 particularly shows edges from the node representing unclassified domain 175c, as traversing the graph to the opposite side to connect to the nodes for hosts 165a/b/c. The depiction graphically indicates that internal hosts 150a/b/c accessed external domain 150c. Although bipartite graph 180 shows edges connecting hosts and domains, in some implementations, bipartite graphs contain edges between nodes of the within the same Subsequently, the MDID 130 can employ the Graph Analytics Module 135 to apply graph analysis measures on the bipartite graph 180. According to an embodiment, the Graph Analytics Module 135 applies algorithms to iteratively calculate reputation scores for each node in the bipartite graph 180. In some cases, reputation scores are assigned to nodes representing domains that have been previously classified by the system 100, such as "KNOWN" domains 150a/b/d. Thus, the Graphic Analytics Module 135 may initially assign predetermined reputation scores to nodes 170a/b/d, which correspond to the known classification. In some embodiments, the classifications and previous reputation scores associated with network nodes may also be retrieved as log data by the MDID 130. Additionally, the Graphic Analytics Module 135 can assign a predetermined reputation score to nodes corresponding to unknown classifications. Thus, according to the example, node 175c can be assigned a score associated with the "1 Module 135 executes subsequent iterations of the algorithm in a score tuning process, until a predefined condition is satisfied. In some cases, the predefined condition can be a specified number of iterations. Accordingly, the Graph Analytics Module 135 continues to iteratively recalculate until the maximum iteration number is reached, the ending the computations for score tuning and outputting final reputation scores for the nodes in the network graph. The score tuning process is described in further detail in reference to FIG. 2.

The MDID 130 can utilize final reputation scores calculated by the Analytics Module 135 for identification of malicious domains, and various others network security functions. In the case of the example, the MDID 130 can utilize the computed final reputation score for node 175c in order to classify the corresponding domain 150c. The MDID 130 can determine whether the reputation score for node 175c falls within a range of reputation scores corresponding to confirmed malicious domains. Referring back to the example, the final reputation score computed for 150c may be −0.9, and a range of reputation scores for classifying a domain as malicious may be [−1, −0, 8], thus classifying domain 150c as malicious. In some cases, final reputation scores are subject to further analysis prior to confirming a classification, or incorporating a newly identified potentially malicious node into the network security functions of the system Additional analysis can be performed automatically by a resource of the system 100, such as the Network Protection Tools 125, or manually by an administrator or security officer that oversees security management of the network 140. In the example, upon an administrator confirming, based at least in part on the reputation score, that domain 150c is classified as malicious, the domain may be included in a blacklist of the Network Protection Tools 125, and the proxy 120 may redirect all data traffic from network 140 attempting to access the destination IP address of domain 150c.

Figure 2:
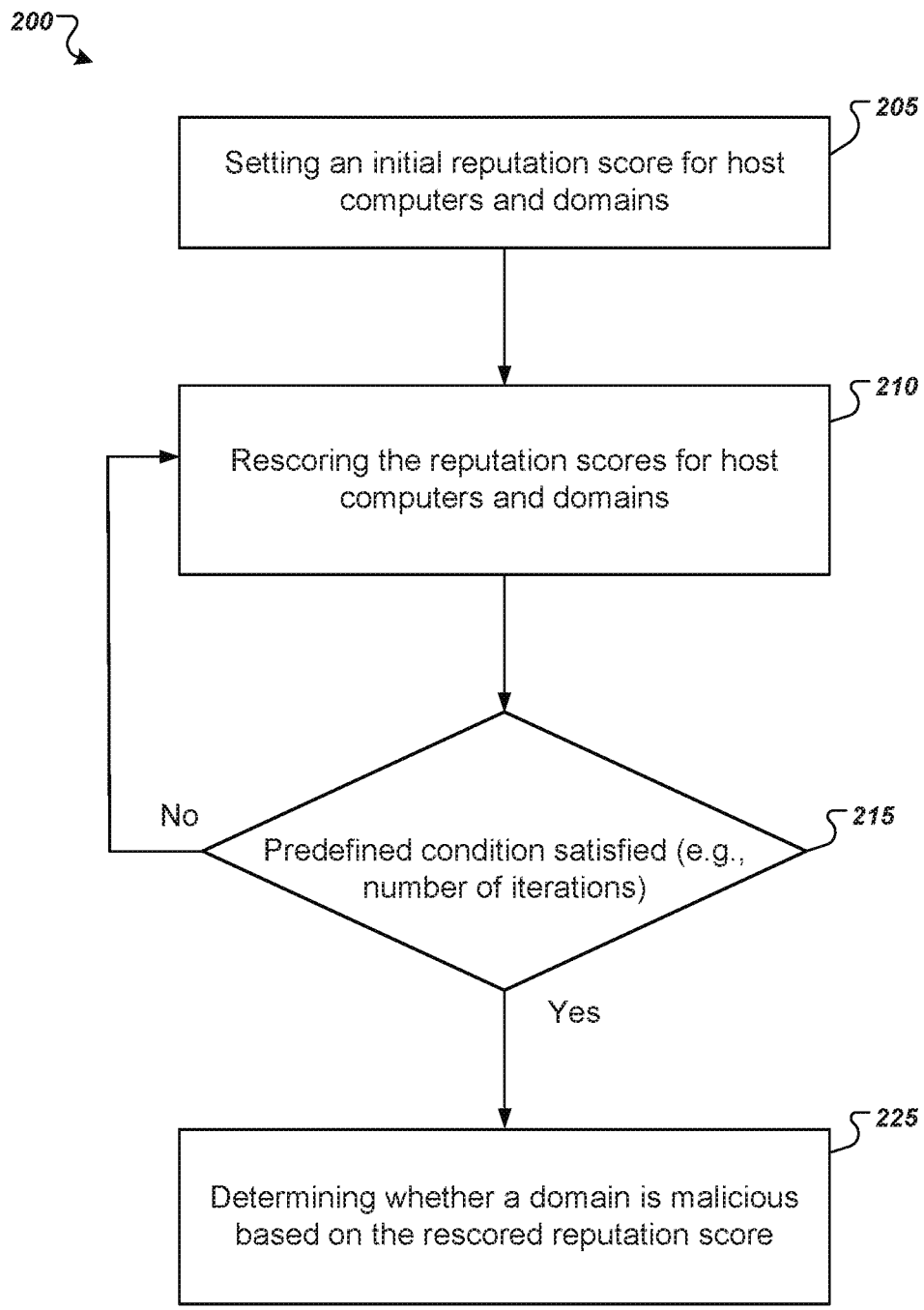
FIG. 2 illustrates a flow chart of an example process of malicious domain identification based on graph analysis techniques relative to the example computing network of FIG. 1.

FIG. 2 illustrates a flow chart of an example process 200 of malicious domain identification based on graph analysis techniques relative to the example computing network of FIG. 1. Process 200 begins at block 205 and includes setting, by a device such as the MDID, initial reputation scores for hosts and domains accessed by the respective hosts. In some cases, the initial reputation scores are assigned to nodes within a graphical model associated with the network built, based at least in part, on log data. Log data generated by one or more devices of the system 100 can be visualized as a graph or mode of the network, and a bipartite graph in some embodiments. The produced graphical model of the network can be based, at least in part, on extracted log entries including a parameter of interest. The parameter of interest can be any parameter related to potential malicious activity occurring in association with network 140. As examples, parameters associated with a certain activity or event occurring within network 140 can log data associated with an IP of a computer asset confirmed as infected with malware, DNS queries, or outbound connections to external domains.

As previously discussed, domains can be identified as one of a plurality of classifications, including but not limited to: known non-malicious (e.g., good); known malicious; and known suspicious. Furthermore, initial reputation scores can be predetermined values selected from a range of values based, at least in part, on the defined classifications. In some embodiments, a known non-malicious classification corresponds to a reputation score that is a positive value in the range of [0,1]. A known malicious classification corresponds to a reputation score that is a negative value that in the range of [−1,0]. A known suspicious classification corresponds to a reputation score that is a negative value that is in the range of [−1,0]. If a domain is unclassified, or otherwise not associated with the aforementioned classifications, the domain is assigned a reputation score that is a positive value in the range of [0,1].

Similarly, internal hosts that are confirmed as malicious (e.g., known compromise has occurred on the computer asset) can be assigned an initial reputation score that is a negative value in the range of [−1,0]. Otherwise, an internal host can be assigned a reputation score that is a positive value in the range of [0,1].

Alternatively, in some embodiments the initial reputation scores can be predetermined values directly corresponding to a value associated with a defined classification. In some embodiments, a known non-malicious classification corresponds to a reputation score of 0.9. A known malicious classification corresponds to a reputation score of −0.9. A known suspicious classification corresponds to a reputation score of −0.6. If a domain is unclassified, then the domain is assigned a reputation score of 0. Moreover, internal hosts that have not been confirmed as compromised are assigned a reputation score of 0. In some embodiments, the initial reputation scores, and classifications, are parameters that are predetermined manually by an administrator for example. In other cases, the initial reputation scores are parameters that are automatically defined by a device of the system 100, such as MDID 130. As a general description, the system 100 is design to assign initial reputation scores that are small values (e.g., between −1 and 1), thereby allowing the scores to act as tunable parameters that may be weighted by other constraints deemed relevant to the network configuration and intrusion detection during graph analysis techniques. For example, a large number of connections to a particular node can effectuate an increase in the reputation score, indicating that the system 100 may generally have a higher confidence (e.g., lower risk of maliciousness) in sites allowed to be highly trafficked site by the network security functions. Moreover, initial reputation scores are designed to allow for the MDID 130 to correct for scores, during the tuning process, that could be impacted by a risk associated with proximate nodes. For instance, an initial reputation score that is a smaller value assigned to an otherwise good node, which is connected to a known malicious domain, can have that reputation score iteratively adjusted to account for the additional risk of being compromised by the malicious node. There is additional value in identifying internal hosts with lower reputation scores. These internal hosts are more likely to be compromised and part of a breach than the a priori. This information can be added to determine the full scope of an internal breach.

In some cases, a base reputation score can be applied to all nodes that are not associated with a predefined classification, or have not been previously identified by a network protection tool, such as a whitelist or blacklist. For example, nodes associated with newly registered domains can be assigned a base reputation score of 0.001. The base reputation scores are comparative smaller in value than the initial reputation scores assigned to previously classified nodes, as the system 100 may have more confidence in the initially set reputation scores of domains and/or host that are already verified by the system. In comparison, there may be lower confidence in the aforementioned base reputation scores, which are effectively assumed by the system 100, in some cases, with little or no information collected on the corresponding node. Thus base reputation scores may be substantially small values by design, in order for the system 100 to more heavily tune these scores using the graph analysis measures.

Alternatively, the system 100 can employ verified reputation scores that may include higher values (as compared to base reputation scores), such that these scores are less susceptible to score tuning implemented by the graph analytics measures. In some cases, the verified reputation scores are completely locked to the initially set value, so as to preclude tuning or adjusting (e.g., overwriting the value) during rescoring by the process. In some implementations, the system is configured to bypass the iterative rescoring process for identified verified reputation scores. Verified reputation scores can be assigned to nodes that have been through one or more verification processes deemed appropriate or suitable for confirming that the computer asset is known malicious, or known non-malicious. As an example, a node corresponding to an IP address that has been manually vetted by a network administrator or security officer may be assigned a verified reputation score. In some implementations, verified reputation scores may be entered into the system 100 manually. Alternatively, verified reputation scores can be automatically assigned during the process based on an identifiable parameter (e.g., IP address in a log entry or blacklist/whitelist). Thus, in the example, a node may be initially set to a verified reputation score of 0.9, and subsequent to the iterative process, the final reputation score for the node remains locked to 0.9.

At block 210 process 200 can further include the Graph Analytics Module 135 of the MDID 130 executing graph analytics measures for rescoring the initial reputation scores for the hosts computers and the domains, as represented in the bipartite graph. The Graph Analytics Module 135 can employ various algorithms in a score tuning process until a predefined condition is satisfied, which iteratively includes: rescoring the reputation scores for each of the plurality of host computers based upon the reputation scores of the plurality of domains; and rescoring the reputation scores for each of the plurality of domains based upon the reputation scores of the plurality of host computers. As discussed above, in some implementations, the tuning process accomplishes rescoring by applying equation (1) to calculate a new reputation score for every client node represented in the bipartite graph, and applying equation (2) to calculate a new reputation score for every domain node represented in the bipartite graph. For each node, an iteration of the tuning process can be generally described as involving: determining a current reputation score for the node at the time of the current iteration (e.g., an initial reputation score at the first iteration); applying either of the abovementioned algorithms to compute a new reputation score; propagating the newly computed reputation score to every node determined as having a connection to the current node, based at least in part on the bipartite graph; receiving reputation scores from each of the nodes connected thereto; calculation a summation of the received reputation scores; and continuing to the next iteration. Thus, graph analysis measures of the MDID 130 include iteratively analyzing and recalculating a probabilistic risk of each node in the graph representation of the network based on contributing factors such as prior risk of the node computed at previous time intervals, and risk of adjacent nodes.

In some implementations, graph analysis measures includes determining various graph-related parameters that can be used in the score tuning process, such as a number of connections sourced from a particular node, and identifying nodes with connectivity relationships (e.g., adjacent nodes).

The Graph Analytics Module 135 can analyze characteristics of the generated bipartite graph, such as counting edges and vertices, to determine the necessary parameters. For example, the aforementioned equations (1) and (2) are shown to include the number of connections corresponding to a node as a parameter, which is used to divide a current reputation score of the node. Accordingly, in some implementations, various graph-related parameters, such as the number of connections, may impact the computation of the reputation score and an amount of a portion of the score that is propagated to adjacent nodes.

Moreover, in some implementations, process 200 involves applying a transformation function during the multiple iterations of the tuning process. The transformation function can be implemented as a sigmoid function. A computed reputation score for each iteration can serve as input to the sigmoid function, which pushes the values of the reputation score more quickly to either one of the bounded values of the reputation scores. In some cases, the bounded values are the maximum and minimum extremes for reputation scores, for instance be [−1,1]. For instance, prior to computing the current reputation score for the iteration (e.g., subsequent to summing the received reputation scores), the value may be close to zero. Applying the sigmoid function, in this instance, can push the reputation from away from zero and towards either one of the extremes for the value. As an example, a reputation score can be input into the sigmoid function having a value of 0.1, and output from the sigmoid function having a value of 0.3, which is further away from zero. According to the disclosed embodiments, the Graph Analytics Module 135 can apply the transformation function to the iteratively calculated reputation scores, using the equations below:

$$s(x) = \frac{L*x}{1+|L*x|} \quad (3)$$

In Equation (3), L is the learning rate

In implementations that include the transformation function during the rescoring of block 210, the learning rate can be a tunable parameter allowing the algorithm to learn at a specified rate. In cases where the transformation function involves an increased learning rate, the Graph Analytics Module 135 is then configured to learn more quickly, and reaching the predefined condition for halting the iterative process. In turn, the MDID 130 utilizing the sigmoid function can execute the score tuning process at a higher speed. Employing the transformation may decrease a run time used for completing the iterative process and realize the advantages associated therewith.

In some implementations, the rescoring of block 210 involves the ability to bound the transmitted reputation scores. Before a node propagates a calculated reputation score to other nodes connected thereto (as indication in the graph), the values can be bounded so as to provide a countermeasure for extreme case scenarios. Some network configurations may produce an unintended, or improperly weighted, contribution to the rescoring calculations in accordance with the graph analysis measures. Extreme cases scenarios, such as a node classified as known non-malicious (e.g., whitelisted) having a low number of connections in the bipartite graph, or a node classified as known malicious having a large number of connections in the bipartite graph, may effect accuracy of the score tuning and, even further, the overall identification of potentially malicious nodes. To this end, rescoring of block 210 can include bounding one or more current reputation scores for each iteration, prior to transmitting the reputation score to other nodes, so as to effectuate an artificial limitation on a portion of the reputation score that may be propagated by a node. As an example, bounding applied in block 210 can increase a portion of a calculated reputation score, relating to the impact on tuning of a high volume known malicious node, which is transmitted to the connected nodes. Thus, bounding may prevent the reputation score for known maliciousness from being weighted too lowly in the algorithm, by dividing the value by a large number of connections. Alternatively, bounding applied in block 210 can decrease a portion of a calculated reputation score, relating to the impact on tuning of a low volume known non-malicious node. Bounding may prevent the reputation score for known non-maliciousness from being weighted too heavily in the algorithm, by propagating all of the score to a single connected node, for example. Bounding is a dynamic parameter and can be triggered by a identified low or high number or connections.

At block 215, a check is performed to determine whether a predetermined condition has been satisfied, which serves as an exit from the iterative steps of process 200. The predetermined condition can be a parameter that may characterize a minimal amount of change in the network, and similarly a stabilization of the probability of potential maliciousness of the node. The predetermined condition can be defined as one of a plurality of conditions, including but not limited to: reaching a specified number of iterations; identifying that a delta between rescored reputation scores from successive iterations is less than a predefined threshold; and identifying that there is no delta between rescored reputation scores from successive iterations. For example, prior to the Graph Analytics Module 135 executing a next iteration of the score tuning process, the check at block 215 can involve comparing an n count, corresponding to the current iteration number, to a predefined maximum number of iterations for the process to traverse before halting. In cases where the Graph Analytics Module 135 determines that the predetermined condition has not been met, illustrated as "No" in FIG. 2, process 200 can return to block 210. During successive iterations, one or more of the algorithms and operations for the aforementioned graph analysis measures, for instance equations (1), (2), and (3) may be employed to further rescore the reputation scores. Referring back to the example, an n count may also be incrementally increased, such as n+1, as the process 200 executes a next iteration. In other cases where the Graph Analytics Module 315 determines that the predetermined condition has been met, illustrated as "Yes" in FIG. 2, process 200 proceeds to block 225. Subsequent to the last iteration of the score tuning process, final reputation scores for each of the nodes in the bipartite graph are computed.

At block 225, process 200 determines whether a node, (e.g., domain or internal host) is identified as malicious, based at least in part on the final reputation score. As discussed in detail above in reference to FIG. 1, an output of the iterative rescoring process can be one or more final reputation scores. The final reputation scores may be further analyzed by devices of the system, for instance MDID 130 or Network Protection Tools 125 to automatically identify, or otherwise classify, unknown nodes in the bipartite graph. For example, nodes having a final reputation score that are approximately close to a set value (e.g., 1) may be classified as known non-malicious, while nodes having a final reputation score that is approximately close to another set value (e.g., −1) may be classified as malicious. In some cases, a particular computer asset of interest may be a parameter included in process 200. A reputation score corresponding to that parameter can be returned from the MDID 130, and compared against a threshold. As an example, network security functions may compare the returned final reputation score to a threshold associated with reputation scores for malicious nodes, and automatically quarantine (e.g., filter/block access) a computer asset having a reputation that is less than or equal to the threshold for being potentially malicious or exhibiting malicious behavior.

In some implementations, the process 200 may involve propagating reputation scores over multiple IP time periods. Conventional Dynamic Host Configuration Protocol (DHCP) mechanisms can dynamically update its assignment of IP addresses to computer assets at different time intervals (e.g., daily). Therefore, a single computer asset may have differing IP address corresponding to the differing time intervals. For example, an internal host may have had multiple IP addresses assigned thereto over a time period, for example in a month, according to DHCP. Conversely, a single IP address may be tied to multiple computer assets. To account for shared IP spaces, the system 100 can be configured to assign and extract time attributes associated with identified IP addresses, and subsequently separate traffic from individual IPs into corresponding to the IP time periods based at least in part on the associated time attributes. Time attributes can be log data that serves to correspond IP address to a time, such as a log entry including a timestamp that indicates a creation time for the logged IP address. In some implementations, the IP time periods reflect a DHCP release time. Thus, in an example where the DHCP release time dynamically updates IP addresses per day, the graph analytic measures can group, or otherwise separate, nodes into daily IP time periods using the associated time attributes (e.g., traffic from a source IP address in the same day, indicates traffic from the same internal host).

Accordingly, the process 200 can consider time attributes and IP time periods corresponding to IP addresses, and thus incorporates constraints associated with IP time periods into the process. Process 200 can separate nodes of a bipartite graph based at least in part on the multiple identified IP time periods. For instance, an IP address at a particular IP time period has a dedicated node in the bipartite graph. Restated, a bipartite graph represents network activity separated by the associated IP time periods. Then, the process 200 can insert edges between the nodes associated with a shared IP address in different IP time periods (e.g., an edge connecting nodes associated with an internal hosts). Edges connecting nodes within a set can serve as an indication that the nodes are associated with different IP time periods, and thus corresponds these nodes via the edge. In some cases, edges connects node in different IP time periods if the nodes are associated with IP addresses that vary in a sequential manner (e.g., unique IP addresses increased by a single bit). Thereafter, the process 200 can propagate reputation scores for the node via these edges created based on the multiple IP time periods. Accordingly, by employing IP time period techniques, the process can mitigate potential inaccuracies that may be related to using IP address as indictors (e.g., false positive rate). The process 200 allows for a transfer of risk, namely at least a portion of a reputation score, for nodes across IP time periods, thereby accounting for a probability that the individual nodes correspond to the same computer asset. Additionally, the score tuning process incorporates the potential that nodes in different IP time periods represent different computer assets by weighting an amount of a reputation scores that is allowed to propagate across IP time periods during the rescoring of process 200. In some implementations, the last octet of each IP address is removed for the purposes of graph analysis as disclosed herein, in order to address the impact of DHCP and shared IP spaces.

Figure 3:
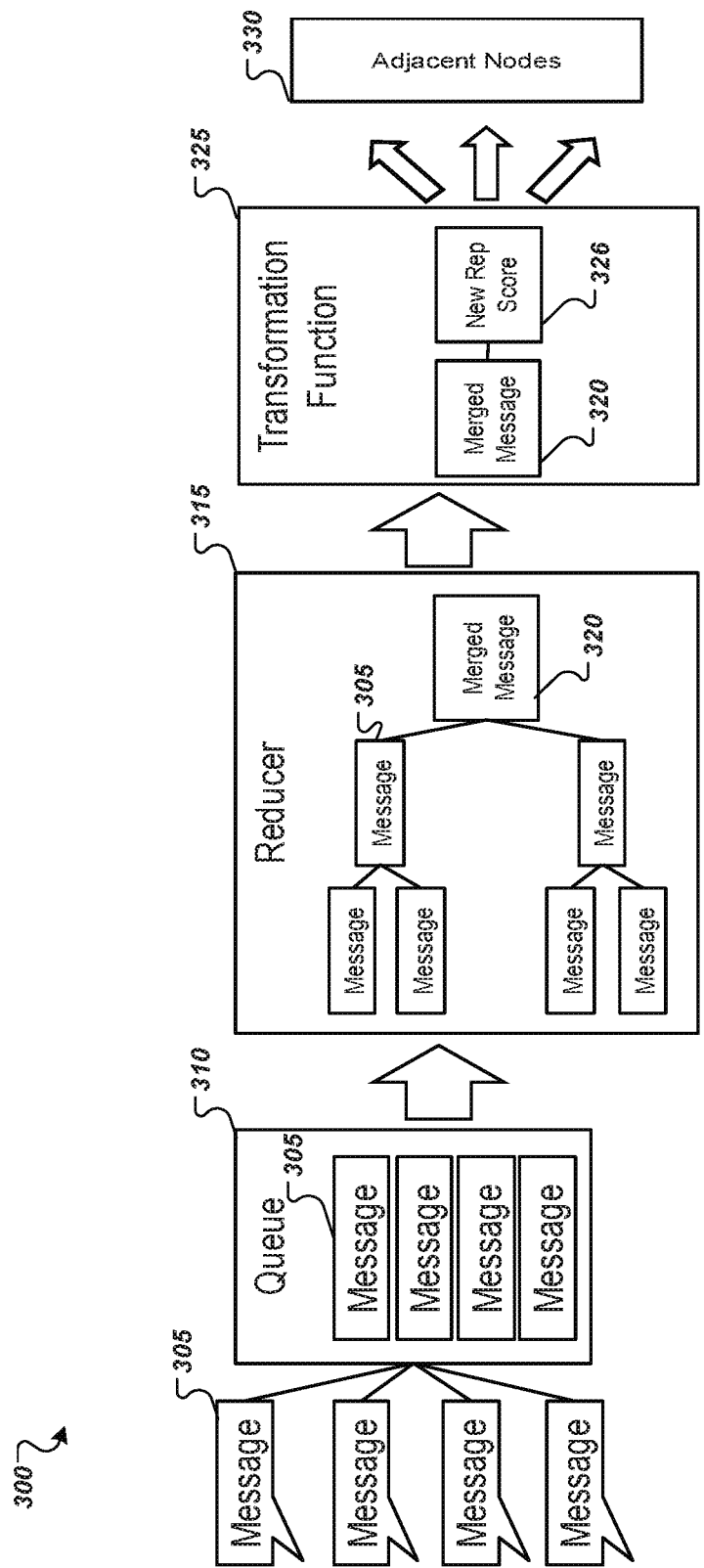
FIG. 3 illustrates a block diagram that depicts an example distributed compute process for implementing parallelization aspects of graph analysis techniques.

FIG. 3 illustrates a block diagram that depicts an example distributed compute process 300 for implementing parallelization aspects of graph analysis techniques. In some implementations, the graph analytics measures involve computations that are distributed across multiple computer assets, for instance servers (e.g., Spark/Hadoop cluster), to perform a designated portion of the computations. Then, a computer asset can return its portion of the computational results to other computers included in the distributed process 300 as deemed necessary. Consequently, the distributed configuration allows for a parallelization, in which multiple computer assets can process their respective portion of the distributed compute process in parallel, thereby realizing advantages of an increasing processing speed. An additional advantage resulting from the distributed nature is that this systems is able to perform analysis on extremely large Bipartite graphs and scale effectively to enterprise level datasets.

The distributed compute process 300, in some embodiments, can separate graph analysis measures per node. That is, the overall graph analysis process can be segmented and distributed, where a segment comprises calculations for a single node in a bipartite graph. Furthermore, individual threads can be designated to execute processing associated with each node of the bipartite graph. As shown, each node executing on an individual thread can correspond to a Message Queue 310 configured for maintaining messages communicated to and/or from the node. The Message Queue 310 is illustrated as containing multiple messages 305 used to communicate data utilized in the various graph analysis measures, such as the iterative score tuning process. In an implementation, the Message Queue 310 contains the current value of the reputation score for the node of the thread. Additionally, the Message Queue 310 may include an outbound degree for every node that is adjacent to the thread's node.

A merge message function, shown in FIG. 3 as the Reducer 315, is executed to combine the individually received messages 305. For example, the Reducer 315 combines messages 305 received from multiple nodes that are connected to the particular node associated with executing thread. Subsequently, the thread transfers the output of the Reducer 315, which is merged message 320. In some cases, merged message 320 includes the summed result of the received reputation scores. The merged message 320 is forwarded, by the executing thread, as input to the Transformation Function 325. Details regarding implementation of the Transformation Function 325 are discussed above in reference to FIG. 2. The Transformation Function 325 applies various operations to the merged message 320, such as equation (3), to produce a new reputation score 326. Thereafter, the thread executes transferring the new reputation score 326 output from the Transformation Function 325, and in some cases an outbound degree, to each of a plurality of adjacent nodes 330. Similarly, each of the adjacent nodes 330 correspond to a respective thread, which is a dedicated computing resource for executing operations of the iterative tuning process for the corresponding node. According to the implementation, the abovementioned thread executes in parallel with the other running threads that are processing operations for each of the other nodes, respectively. Moreover, in some implementations, the distributed and multi-threaded design can include the independent threads running on multiple cores on the same CPU, which leverages advantages of parallel processing capabilities of multi-core central processing units (CPUs) available in some existing computer architectures (e.g., improved processing efficiency).

Figure 4A:
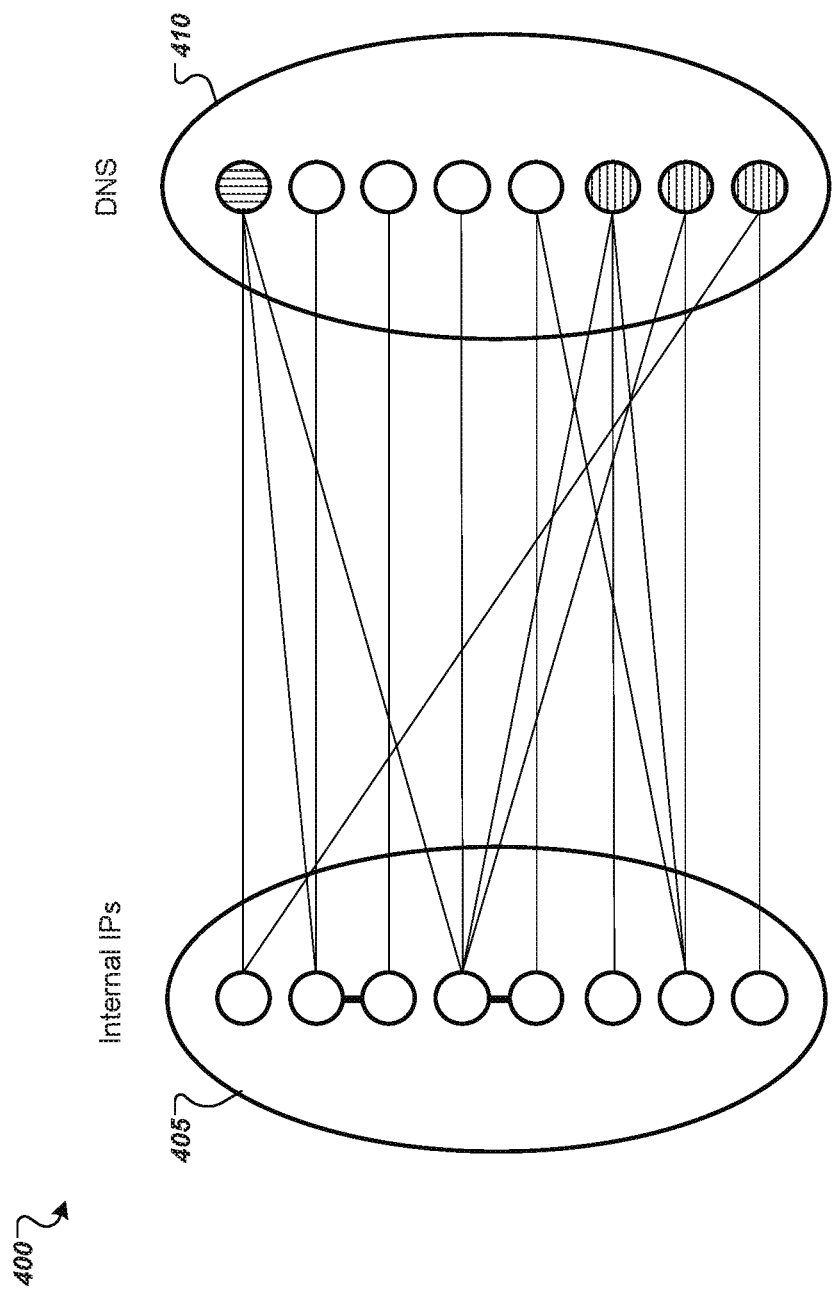

FIGS. 4A-4G illustrate examples of bipartite graphs corresponding to multiple iterations of graph analysis techniques implemented relative to the example computing network of FIG. 1. FIG. 4A shows an example of a bipartite graph 400 that can be generated as an initial step in the graph analytics process described herein. The bipartite graph can be generally described as representing a network, by including nodes representing computers identified by internal IPs included in set 405 and node representing computers identified by DNS in set 410.

Figure 4B:
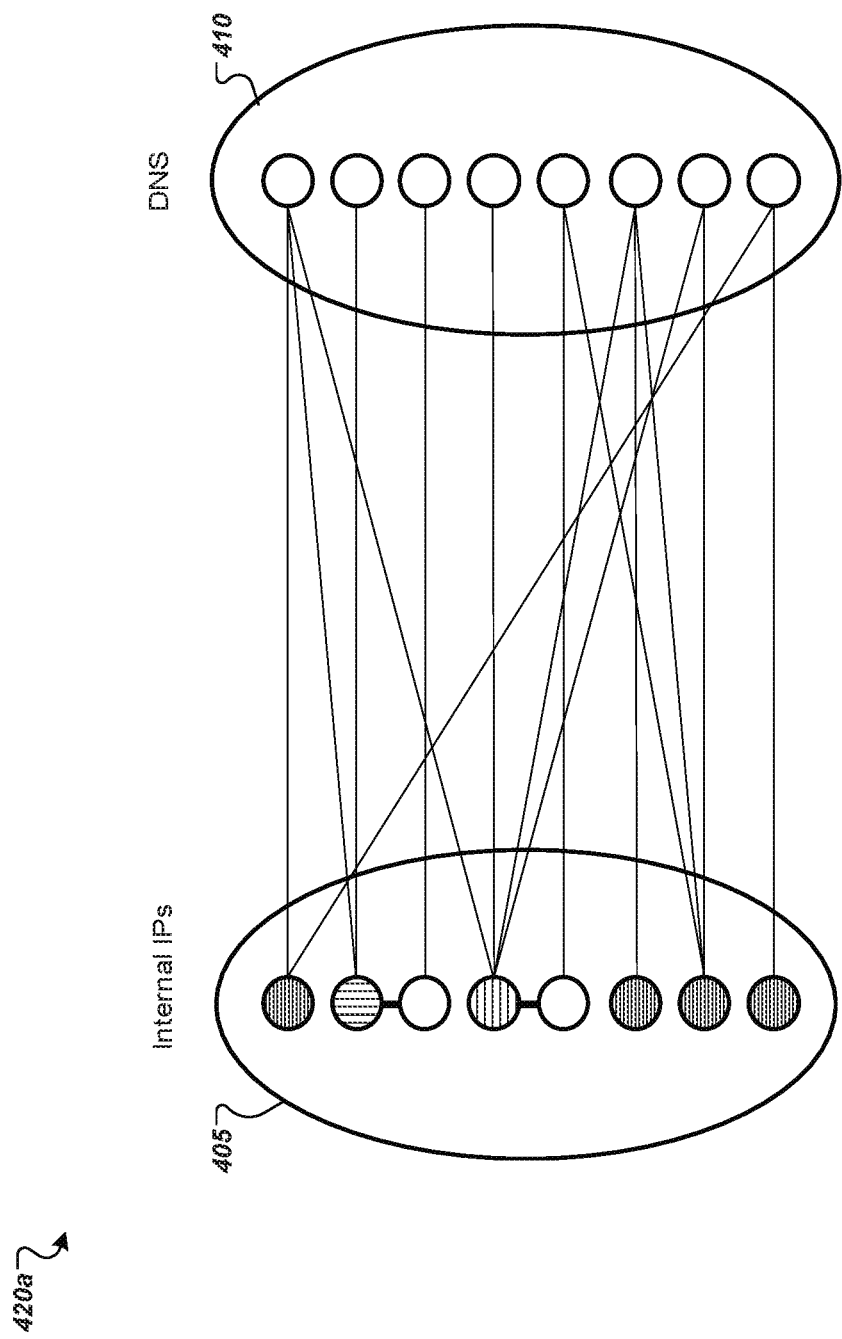

FIG. 4B shows an example of a bipartite graph 420a that can be generated as a result of applying the graph analytics process in a first iteration of the score tuning process, according to an implementation. Example values for reputation scores and outbound degrees for each of the nodes in the bipartite graph 420a calculated during the process in the first iteration are shown in the table below:

| node | degrees out | node | degrees out |
|---|---|---|---|
| i1 | 0.001 | 2 | d1 | -0.9 | 3 |
| i2 | 0.001 | 2 | d2 | 0.001 | 1 |
| i3 | 0.001 | 3 | d3 | 0.001 | 1 |
| i4 | 0.001 | 4 | d4 | 0.001 | 1 |
| i5 | 0.001 | 1 | d5 | 0.001 | 2 |
| i6 | 0.001 | 1 | d6 | 0.9 | 3 |
| i7 | 0.001 | 2 | d7 | 0.9 | 2 |
| i8 | 0.001 | 1 | d8 | 0.9 | 2 |

Figure 4C:
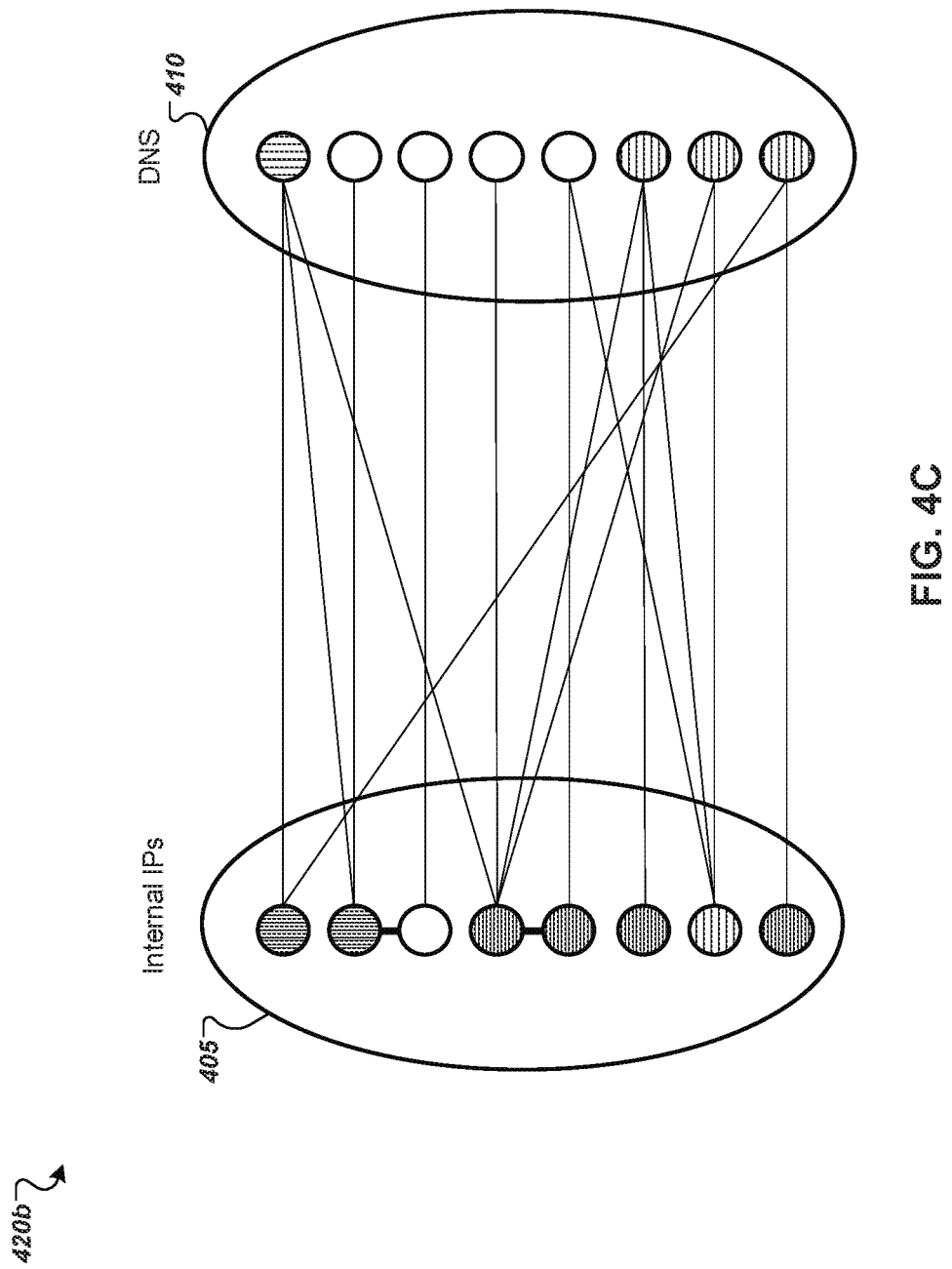

FIG. 4C shows an example of a bipartite graph 420b that can be generated as a result of applying the graph analytics process in a first iteration of the score tuning process, according to another implementation. According to this implementation, algorithms applied in the score tuning process having one or more parameters, including: historical decay having a value of 0.7; malicious bounding having a value of −0.6; non-malicious bounding having a value of 0.3; and a learning rate having a value of 2.

Example values for reputation scores and outbound degrees, using the aforementioned parameters, for each of the nodes in the bipartite graph 420b calculated during the process in the first iteration are shown in the table below:

| node | degrees out | node | degrees out |
|---|---|---|---|
| i1 | 0.001 | 2 | d1 | -0.9 | 3 |
| i2 | 0.001 | 3 | d2 | 0.001 | 1 |
| i3 | 0.001 | 4 | d3 | 0.001 | 1 |
| i4 | 0.001 | 5 | d4 | 0.001 | 1 |
| i5 | 0.001 | 2 | d5 | 0.001 | 2 |
| i6 | 0.001 | 1 | d6 | 0.9 | 3 |
| i7 | 0.001 | 2 | d7 | 0.9 | 2 |
| i8 | 0.001 | 1 | d8 | 0.9 | 2 |

FIG. 4D shows an example of a bipartite graph 430a that can be generated as a result of applying the graph analytics process in a second iteration of the score tuning process, according to the implementation referred to in reference to FIG. B. Example values for reputation scores and outbound degrees for each of the nodes in the bipartite graph 430a calculated during the process in the second iteration are shown in the table below:

| node | degrees out | node | degrees out |
|---|---|---|---|
| i1 | 0.15 | 2 | d1 | 0.00125 | 3 |
| i2 | -0.299 | 2 | d2 | 0.0005 | 1 |
| i3 | 0.001 | 3 | d3 | 0.00033333 | 1 |
| i4 | 1.451 | 4 | d4 | 0.00025 | 1 |
| i5 | 0.0005 | 1 | d5 | 0.0015 | 2 |
| i6 | 0.3 | 1 | d6 | 0.00175 | 3 |
| i7 | 0.7505 | 2 | d7 | 0.00075 | 2 |
| i8 | 0.45 | 1 | d8 | 0.0015 | 2 |

FIG. 4E shows an example of a bipartite graph 430b that can be generated as a result of applying the graph analytics process in a second iteration of the score tuning process, according to the other implementation referred to in reference to FIG. 4C. Example values for reputation scores and outbound degrees for each of the nodes in the bipartite graph 430b calculated during the process in the second iteration are shown in the table below:

| node | degrees out | node | degrees out |
|---|---|---|---|
| i1 | -0.2996498 | 2 | d1 | -0.9 | 3 |
| i2 | -0.5983998 | 3 | d2 | 0.00068358 | 1 |
| i3 | 0.00168358 | 4 | d3 | 0.00060025 | 1 |
| i4 | 0.30135025 | 4 | d4 | 0.00055025 | 1 |
| i5 | 0.30085025 | 2 | d5 | 0.00135025 | 2 |
| i6 | 0.30035025 | 1 | d6 | 0.9 | 3 |
| i7 | 0.60085025 | 2 | d7 | 0.9 | 2 |
| i8 | 0.30035025 | 1 | d8 | 0.9 | 2 |

Figure 4F:
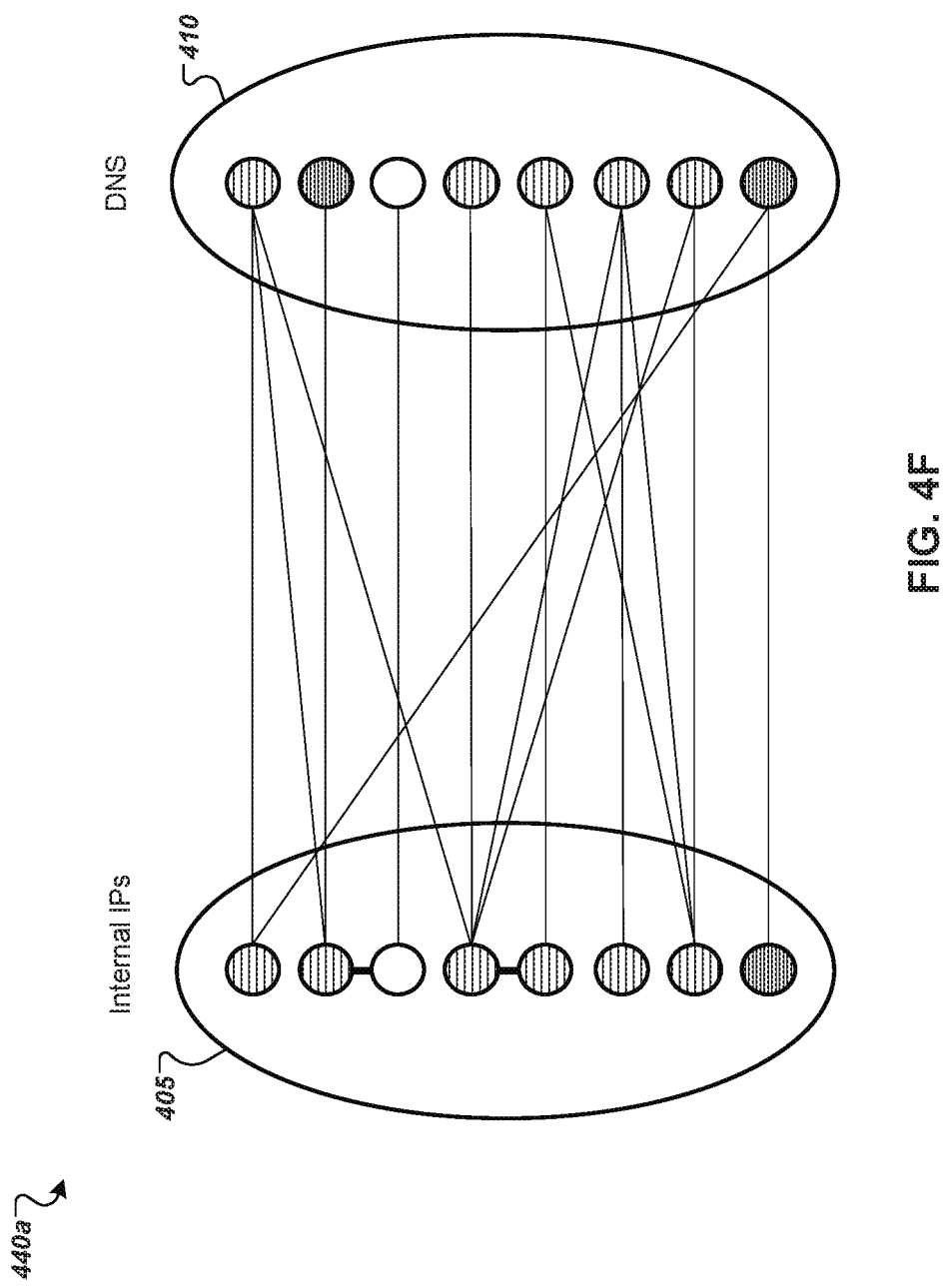

FIG. 4F shows an example of a bipartite graph 440a that can be generated as a result of applying the graph analytics process in a tenth iteration of the score tuning process, according to the implementation referred to in reference to FIG. B. Example values for reputation scores and outbound degrees for each of the nodes in the bipartite graph 440a calculated during the process in the tenth iteration are shown in the table below:

| node | degrees out | node | degrees out |
|---|---|---|---|
| i1 | 0.68990916 | 2 | d1 | 0.90610916 | 3 |
| i2 | 0.65756895 | 2 | d2 | 0.16365664 | 1 |
| i3 | 1.2346E-05 | 3 | d3 | 4.11152E-06 | 1 |
| i4 | 3.84296063 | 4 | d4 | 0.60088194 | 1 |
| i5 | 0.66746582 | 1 | d5 | 0.56393192 | 2 |
| i6 | 0.75335813 | 1 | d6 | 1.32635867 | 3 |
| i7 | 2.25769926 | 2 | d7 | 1.01575025 | 2 |
| i8 | 0.25184643 | 1 | d8 | 0.19685512 | 2 |

Figure 4G:
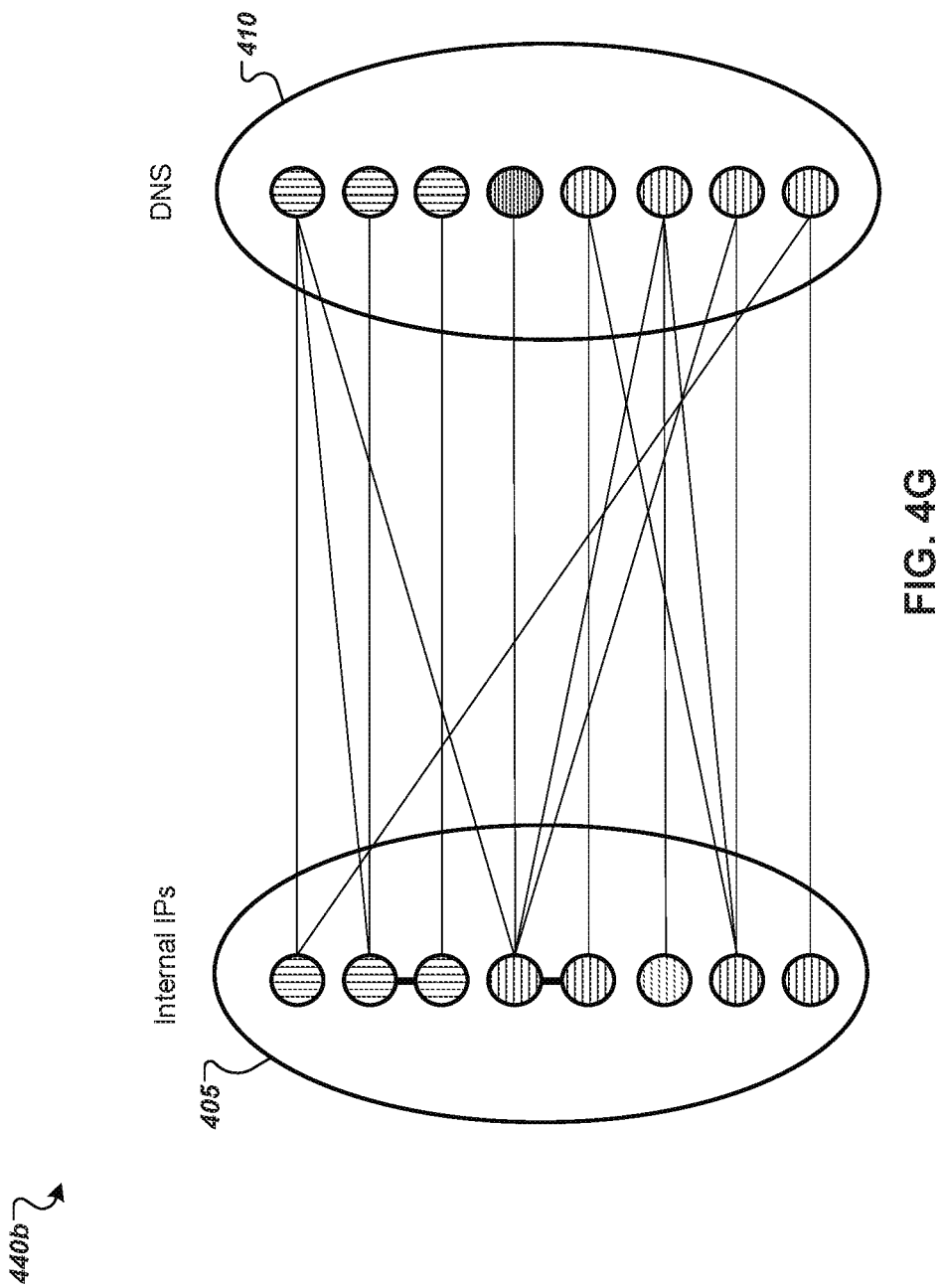

FIG. 4G shows an example of a bipartite graph 440b that can be generated as a result of applying the graph analytics process in a tenth iteration of the score tuning process, according to the other implementation referred to in reference to FIG. 4C. Example values for reputation scores and outbound degrees for each of the nodes in the bipartite graph 440b calculated during the process in the tenth iteration are shown in the table below:

| node | degrees out | node | degrees out |
|---|---|---|---|
| i1 | -1 | 2 | d1 | -0.9 | 3 |
| i2 | -1 | 3 | d2 | -1 | 1 |

-continued

| node | degrees out | node | degrees out |
|------|-------------|------|-------------|
| i3 | −1 | 4 | d3 | −1 | 1 |
| i4 | 1 | 4 | d4 | 0.48933012 | 1 |
| i5 | 1 | 2 | d5 | 1 | 2 |
| i6 | 1 | 1 | d6 | 1 | 3 |
| i7 | 1 | 2 | d7 | 0.9 | 2 |
| i8 | 1 | 1 | d8 | 0.9 | 2 |

According to the example, the bipartite graphs produced in the tenth iteration of the processes, shown in FIGS. 4F-4G may be products of a final iteration of the iterative rescoring process. Therefore, the values generated from the applied graph analytics measures in the tenth iteration can serve as the final reputation scores for the nodes in the bipartite graphs 440a/b. Furthermore, an identification of malicious nodes can be accomplished based, at least in part, on the final reputation scores.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:

generating a bipartite graph based on network log data, wherein nodes of the bipartite graph represent host computers of a plurality of host computers and a plurality of domains that are accessed by the plurality of host computers, and wherein edges of the bipartite graph represent connections that the network log data indicates have occurred between particular host computers and particular domains;

setting an initial numerical reputation score for (i) each of the plurality of host computers that are identified in the bipartite graph using a classification category from two or more first classification categories, and (ii) each of the plurality of domains that are identified in the bipartite graph and that are accessed by the plurality of host computers using a classification category from two or more second classification categories, wherein the initial numerical reputation scores of host computers not associated with known malicious behavior are set to positive values and the initial numerical reputation scores of host computers associated with known malicious behavior are set to negative values;

until a predefined condition is satisfied, iteratively, for a plurality of iterations:

calculating, for the iteration and before calculating any new numerical reputation scores for the domains in the plurality of domains for the iteration, a new numerical reputation score for each of the host computers in the plurality of host computers by rescoring the prior numerical reputation score for the host computer based on an aggregation of the respective numerical reputation scores of the plurality of domains that are connected to the host computer in the bipartite graph, then after calculating, for the iteration, all of the new numerical reputation scores for each of the host computers in the plurality of host computers, calculating the new numerical reputation score for each of the domains in the plurality of domains by rescoring the prior numerical reputation score for the domain based on an aggregation of the respective numerical reputation scores of the plurality of host computers that are connected to the domain in the bipartite graph,
wherein nodes that represent domains or host computers are not added to the bipartite graph during the plurality of iterations;
after the predefined condition is satisfied, determining, based upon the new numerical reputation scores for each of the plurality of host computers and the new numerical reputation scores for each of the plurality of domains, that one or more domains amongst the plurality of domains have numerical reputation scores that are negative; and
performing one or more corrective actions, upon determining that one of more domains amongst the plurality of domains have numerical reputation scores that are negative, wherein the one or more corrective actions comprise:
rescoring a blacklist of known malicious domains to include the one or more domains; ranking the one or more domains as potentially malicious domains in an order corresponding to the rescored numerical reputation scores for each of the plurality of domains respectively; and redirecting network traffic attempting to access the one or more domains.

2. The method of claim 1, wherein rescoring the prior reputation score for the domain comprises:
transmitting, from each of the plurality of domains, the reputation score for the domain to each host computer connected to the domain in the bipartite graph;
receiving, by each of the plurality of domains, a reputation score for each host computer connected to the domain in the bipartite graph; and
rescoring, for each of the plurality of domains, the reputation score for the domain based on a summation of the received reputation scores for each host computer connected to the domain in the bipartite graph.

3. The method of claim 2, wherein the summation of the received reputation scores for each host computer connected to the domain is adjusted based on a sigmoid function including a specified learning rate.

4. The method of claim 2, further comprising, before transmitting the reputation score, bounding a reputation score for a domain associated with a number of connections in the bipartite graph being above a maximum threshold or a number of connections in the bipartite graph being below a minimum.

5. The method of claim 1, wherein rescoring the prior reputation score for the host computer comprises:
transmitting, from each of the plurality of host computers, the reputation score for the host computer to each domain to which the host computer is connected in the bipartite graph;
receiving, by each of the plurality of host computers, a reputation score for each domain to which the host computer is connected in the bipartite graph; and
rescoring, for each of the plurality of host computers, the reputation score for the host computer based on a summation of the received reputation scores for each domain to which the host computer is connected in the bipartite graph.

6. The method of claim 5, wherein the summation of the received reputation scores for each domain to which the host computer is connected is adjusted based on a sigmoid function including a specified learning rate.

7. The method of claim 1, wherein the predefined condition comprises at least one of:
reaching a specified number of iterations;
identifying that a delta between rescored reputation scores is less than a predefined threshold; and
identifying that no delta between rescored reputation scores.

8. The method of claim 1, wherein:
setting the initial reputation scores for each of a plurality of domains using a classification category from the two or more second classification categories comprises setting the initial reputation scores for each of a plurality of domains using one or more of:
a positive value indicating a known good domain;
a first negative value indicating a known malicious domain; and
a second negative value indicating a known suspicious domain, wherein the second negative value is less than the first negative value; and
rescoring, for each of the plurality of domains, the prior reputation score for the domain comprises rescoring, for each of the plurality of domains and for a first iteration in the plurality of iterations and using the one or more respective reputation scores of the subset of the plurality of host computers that are connected to the domain in the bipartite graph, the initial reputation score for the domain that comprises one or more of:
the positive value indicating a known good domain;
the first negative value indicating a known malicious domain; and
the second negative value indicating a known suspicious domain, wherein the second negative value is less than the first negative value.

9. The method of claim 8, wherein:
the initial reputation score for a domain included in a blacklist of known malicious domains or a whitelist of good domains is precluded from rescoring but is used to rescore reputation scores of host computers connected to the domain; and
rescoring, for each of the plurality of domains, the prior reputation score for the domain comprises rescoring, for each of the plurality of domains other than any domains that are included in the blacklist of known malicious domains or the whitelist of good domains, the prior reputation score for the domain.

10. The method of claim 1, further comprising:
assigning one or more time periods associated with identified Internet Protocol (IP) addresses for the plurality of host computers;
propagating a portion of a reputation score for a host computer associated with an IP address corresponding to a first time period to the same IP address corresponding to one or more additional time periods; and
rescoring the reputation scores for each of the plurality of host computers based on the assigned time periods and the propagated portion of a reputation score.

11. The method of claim 1, wherein calculating, for the iteration, a new reputation score for each of the host computers in the plurality of host computers by rescoring the prior reputation score for the host computer based on an aggregation of the respective reputation scores of the plurality of domains that are connected to the host computer in the bipartite graph comprises:
calculating, for a second iteration of the iterations, a third reputation score for each of the host computers in the plurality of host computers based on a summation of all of the respective reputation scores of the plurality of domains that are connected to the host computer in the bipartite graph, wherein after calculating, for the iteration, the new reputation scores for each of the host computers in the plurality of host computers, calculating a new reputation score for each of the domains in the plurality of domains by rescoring the prior reputation score for the domain based on an aggregation of the respective reputation scores of the plurality of host computers that are connected to the domain in the bipartite graph comprises:

calculating, for the second iteration of the iterations, a third reputation score for each of the domains in the plurality of domains based on a summation of all of the respective reputation scores of the plurality of host computers that are connected to the domain in the bipartite graph.

12. A system comprising one or more computers and one or more storage devices storing instructions that are operable, when executed by the one or more computers, to cause the one or more computers to perform operations comprising:

generating a bipartite graph based on network log data, wherein nodes of the bipartite graph represent host computers of a plurality of host computers and a plurality of domains that are accessed by the plurality of host computers, and wherein edges of the bipartite graph represent connections that the network log data indicates have occurred between particular host computers and particular domains;

setting an initial numerical reputation score for (i) each of the plurality of host computers that are identified in the bipartite graph using a classification category from two or more first classification categories, and (ii) each of the plurality of domains that are identified in the bipartite graph and that are accessed by the plurality of host computers using a classification category from two or more second classification categories, wherein the initial numerical reputation scores of host computers not associated with known malicious behavior are set to positive values and the initial numerical reputation scores of host computers associated with known malicious behavior are set to negative values;

until a predefined condition is satisfied, iteratively, for a plurality of iterations:

calculating, for the iteration and before calculating any new numerical reputation scores for the domains in the plurality of domains for the iteration, a new numerical reputation score for each of the host computers in the plurality of host computers by rescoring the prior numerical reputation score for the host computer based on an aggregation of the respective numerical reputation scores of the plurality of domains that are connected to the host computer in the bipartite graph, then after calculating, for the iteration, all of the new numerical reputation scores for each of the host computers in the plurality of host computers, calculating the new numerical reputation score for each of the domains in the plurality of domains by rescoring the prior numerical reputation score for the domain based on an aggregation of the respective numerical reputation scores of the plurality of host computers that are connected to the domain in the bipartite graph, wherein nodes that represent domains or host computers are not added to the bipartite graph during the plurality of iterations;

after the predefined condition is satisfied, determining, based upon the new numerical reputation scores for each of the plurality of host computers and the new numerical reputation scores for each of the plurality of domains, that one or more domains amongst the plurality of domains have numerical reputation scores that are negative; and performing one or more corrective actions, upon determining that one of more domains amongst the plurality of domains have numerical reputation scores that are negative, wherein the one or more corrective actions comprise: rescoring a blacklist of known malicious domains to include the one or more domains; ranking the one or more domains as potentially malicious domains in an order corresponding to the rescored numerical reputation scores for each of the plurality of domains respectively; and redirecting network traffic attempting to access the one or more domains.

13. The system of claim 12, wherein rescoring the prior reputation score for the domain comprises:

transmitting, from each of the plurality of domains, the reputation score for the domain to each host computer connected to the domain in the bipartite graph;

receiving, by each of the plurality of domains, a reputation score for each host computer connected to the domain in the bipartite graph; and rescoring, for each of the plurality of domains, the reputation score for the domain based on a summation of the received reputation scores for each host computer connected to the domain in the bipartite graph.

14. The system of claim 13, wherein the summation of the received reputation scores for each host computer connected to the domain is adjusted based on a sigmoid function including a specified learning rate.

15. The system of claim 13, wherein the operations further comprise, before transmitting the reputation score, bounding a reputation score for a domain associated with a number of connections in the bipartite graph being above a maximum threshold or a number of connections in the bipartite graph being below a minimum.

16. The system of claim 12, wherein rescoring the prior reputation score for the host computer comprises:

transmitting, from each of the plurality of host computers, the reputation score for the host computer to each domain to which the host computer is connected in the bipartite graph;

receiving, by each of the plurality of host computers, a reputation score for each domain to which the host computer is connected in the bipartite graph; and rescoring, for each of the plurality of host computers, the reputation score for the host computer based on a summation of the received reputation scores for each domain to which the host computer is connected in the bipartite graph.

17. The system of claim 16, wherein the summation of the received reputation scores for each domain to which the host computer is connected is adjusted based on a sigmoid function including a specified learning rate.

18. A computer-readable storage device storing instructions executable by one or more computers which, upon such execution, cause the one or more computers to perform operations comprising:

generating a bipartite graph based on network log data, wherein nodes of the bipartite graph represent host computers of a plurality of host computers and a plurality of domains that are accessed by the plurality of host computers, and wherein edges of the bipartite graph represent connections that the network log data indicates have occurred between particular host computers and particular domains;

setting an initial numerical reputation score for (i) each of the plurality of host computers that are identified in the bipartite graph using a classification category from two or more first classification categories, and (ii) each of the plurality of domains that are identified in the bipartite graph and that are accessed by the plurality of host computers using a classification category from two or more second classification categories, wherein the initial numerical reputation scores of host computers not associated with known malicious behavior are set to positive values and the initial numerical reputation scores of host computers associated with known malicious behavior are set to negative values;

until a predefined condition is satisfied, iteratively, for a plurality of iterations:

calculating, for the iteration and before calculating any new numerical reputation scores for the domains in the plurality of domains for the iteration, a new numerical reputation score for each of the host computers in the plurality of host computers by rescoring the prior numerical reputation score for the host computer based on an aggregation of the respective numerical reputation scores of the plurality of domains that are connected to the host computer in the bipartite graph, then after calculating, for the iteration, all of the new numerical reputation scores for each of the host computers in the plurality of host computers, calculating the new numerical reputation score for each of the domains in the plurality of domains by rescoring the prior numerical reputation score for the domain based on an aggregation of the respective numerical reputation scores of the plurality of host computers that are connected to the domain in the bipartite graph, wherein nodes that represent domains or host computers are not added to the bipartite graph during the plurality of iterations;

after the predefined condition is satisfied, determining, based upon the new numerical reputation scores for each of the plurality of host computers and the new numerical reputation scores for each of the plurality of domains, that one or more domains amongst the plurality of domains have numerical reputation scores that are negative; and performing one or more corrective actions, upon determining that one of more domains amongst the plurality of domains have numerical reputation scores that are negative, wherein the one or more corrective actions comprise: rescoring a blacklist of known malicious domains to include the one or more domains; ranking the one or more domains as potentially malicious domains in an order corresponding to the rescored numerical reputation scores for each of the plurality of domains respectively; and redirecting network traffic attempting to access the one or more domains.

* * * * *

UNITED STATES PATENT AND TRADEMARK OFFICE
CERTIFICATE OF CORRECTION

PATENT NO. : 11,122,063 B2  
APPLICATION NO. : 15/917908  
DATED : September 14, 2021  
INVENTOR(S) : Louis William DiValentin and Dillon J. Cullinan Page 1 of 1

It is certified that error appears in the above-identified patent and that said Letters Patent is hereby corrected as shown below:

In the Claims

In Claim 1, Column 21, Line 15, delete "one of more" and insert -- one or more --, therefor.

In Claim 12, Column 24, Line 9, delete "one of more" and insert -- one or more --, therefor.

In Claim 20, Column 26, Line 20, delete "one of more" and insert -- one or more --, therefor.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*